US011722295B2

(12) United States Patent
Zeigler et al.

(10) Patent No.: US 11,722,295 B2
(45) Date of Patent: Aug. 8, 2023

(54) METHODS, APPARATUS, AND ARTICLES OF MANUFACTURE TO SECURELY AUDIT COMMUNICATIONS

(71) Applicant: Musarubra US LLC, San Jose, CA (US)

(72) Inventors: Arthur S. Zeigler, Gaston, OR (US); Eric Wuehler, Beaverton, OR (US); Jonathan B. King, Hillsboro, OR (US)

(73) Assignee: Musarubra US LLC, San Jose, CA (US)

( * ) Notice: Subject to any disclaimer, the term of this patent is extended or adjusted under 35 U.S.C. 154(b) by 212 days.

(21) Appl. No.: 16/864,107

(22) Filed: Apr. 30, 2020

(65) Prior Publication Data

US 2021/0344483 A1 Nov. 4, 2021

(51) Int. Cl.
*H04L 9/08* (2006.01)
*H04L 9/14* (2006.01)
*H04L 9/40* (2022.01)

(52) U.S. Cl.
CPC ............ *H04L 9/0819* (2013.01); *H04L 9/085* (2013.01); *H04L 9/14* (2013.01); *H04L 63/0428* (2013.01); *H04L 63/1416* (2013.01); *H04L 63/20* (2013.01)

(58) Field of Classification Search
CPC ... H04L 9/0819; H04L 9/085; H04L 63/1416; H04L 63/20
USPC ......................................................... 713/171
See application file for complete search history.

(56) References Cited

U.S. PATENT DOCUMENTS

| 8,756,423 | B2* | 6/2014 | Djordjrvic | ............ H04L 63/126 713/170 |
|---|---|---|---|---|
| 11,082,217 | B1* | 8/2021 | Donlan | ................. H04L 9/0861 |
| 11,283,603 | B2* | 3/2022 | Nix | ........................ H04L 9/0861 |
| 2007/0208949 | A1* | 9/2007 | Lu | ............................ G06F 21/32 713/186 |
| 2008/0049942 | A1* | 2/2008 | Sprunk | ................... H04L 9/006 380/283 |
| 2008/0104348 | A1* | 5/2008 | Kabzinski | ........... G06F 21/6218 711/E12.001 |

(Continued)

OTHER PUBLICATIONS

McAfee, "McAfee Enterprise Security Manager," Data Sheet, Mar. 2018 (4 pages).

(Continued)

*Primary Examiner* — Teshome Hailu
(74) *Attorney, Agent, or Firm* — Hanley, Flight and Zimmerman, LLC

(57) ABSTRACT

Methods, apparatus, systems, and articles of manufacture are disclosed to securely audit communications. An example apparatus includes a participant list generator to, responsive to a command to provision a secured group of devices in a network to prevent malicious activity, generate a participant device list including one or more endpoint devices and a control plane server; a privilege controller to, based on a policy indicated in the command, set read and write privileges for the one or more endpoint devices and the control plane server; a command controller to, based on the command, determine whether to generate a shared communication key using a shared system key; and a communication processor to encrypt communications between the one or more endpoint devices and the control plane server using the shared communication key.

17 Claims, 12 Drawing Sheets

(56) References Cited

U.S. PATENT DOCUMENTS

| | | | | |
|---|---|---|---|---|
| 2009/0060189 | A1* | 3/2009 | Osajima | H04L 9/0833 380/279 |
| 2012/0096214 | A1* | 4/2012 | Lu | G06F 21/60 711/E12.091 |
| 2012/0151565 | A1* | 6/2012 | Fiterman | H04L 63/102 726/7 |
| 2013/0159728 | A1* | 6/2013 | Beckwith | H04L 9/3255 713/189 |
| 2014/0115655 | A1* | 4/2014 | Marvais | G06F 21/45 726/1 |
| 2014/0331280 | A1* | 11/2014 | Porras | H04L 63/20 726/1 |
| 2015/0254477 | A1* | 9/2015 | Matsumoto | G06F 21/72 713/193 |
| 2016/0330209 | A1 | 11/2016 | Iacob et al. | |
| 2016/0366111 | A1 | 12/2016 | Smith et al. | |

OTHER PUBLICATIONS

McAfee, "McAfee ePolicy Orchestrator," Data Sheet, Nov. 2018 (7 pages).

Katriel Cohn-Gordon, Cas Cremers, Luke Garratt, Jon Millican, and Kevin Milner, "On Ends-to-Ends Encryption: Asynchronous Group Messaging with Strong Security Guarantees," Version 2.1, Jan. 18, 2018 (32 pages).

International Searching Authority, "International Search Report and Written Opinion," issued in connection with International Application No. PCT/US2021/030004, dated Aug. 20, 2021, 15 pages.

Tiloca et al., "Group OSCORE—Secure Group Communication for CoAP: draft-ietf-core-oscore-groupcomm-06," IETF Trust, Nov. 4, 2019, [https://datatracker.ietf.org/doc/html/draft-ietf-core-oscore-groupcomm-06] retrieved on Oct. 28, 2022, 48 pages.

Barnes et al., "The Messaging Layer Security (MLS) Protocol: draft-ietf-mls-protocol-09," IETF Trust, Mar. 6, 2020, [https://datatracker.ietf.org/doc/html/draft-ietf-mls-protocol-09] retrieved on Oct. 28, 2022, 73 pages.

* cited by examiner

METHODS, APPARATUS, AND ARTICLES OF MANUFACTURE TO SECURELY AUDIT COMMUNICATIONS

FIELD OF THE DISCLOSURE

This disclosure relates generally to malicious attack prevention, and, more particularly, to methods, apparatus, and articles of manufacture to securely audit communications.

BACKGROUND

To improve security, messaging platforms such as the iMessage® messaging platform, the Facebook® Messenger messaging platform, the WhatsApp® messaging platform, among others, have implemented end-to-end encryption. When a messaging platform incorporates end-to-end encryption, the messaging platform intends to prevent anyone (e.g., other than the true sending device and true receiving device) from reading and/or altering communications between the true sending device and true receiving device. End-to-end encryption has evolved from originally meaning that communications remained encrypted along each leg of a multi-step transmission process, to where not even the messaging platform can decrypt transmissions from true sending devices to true receiving.

Figure 1:
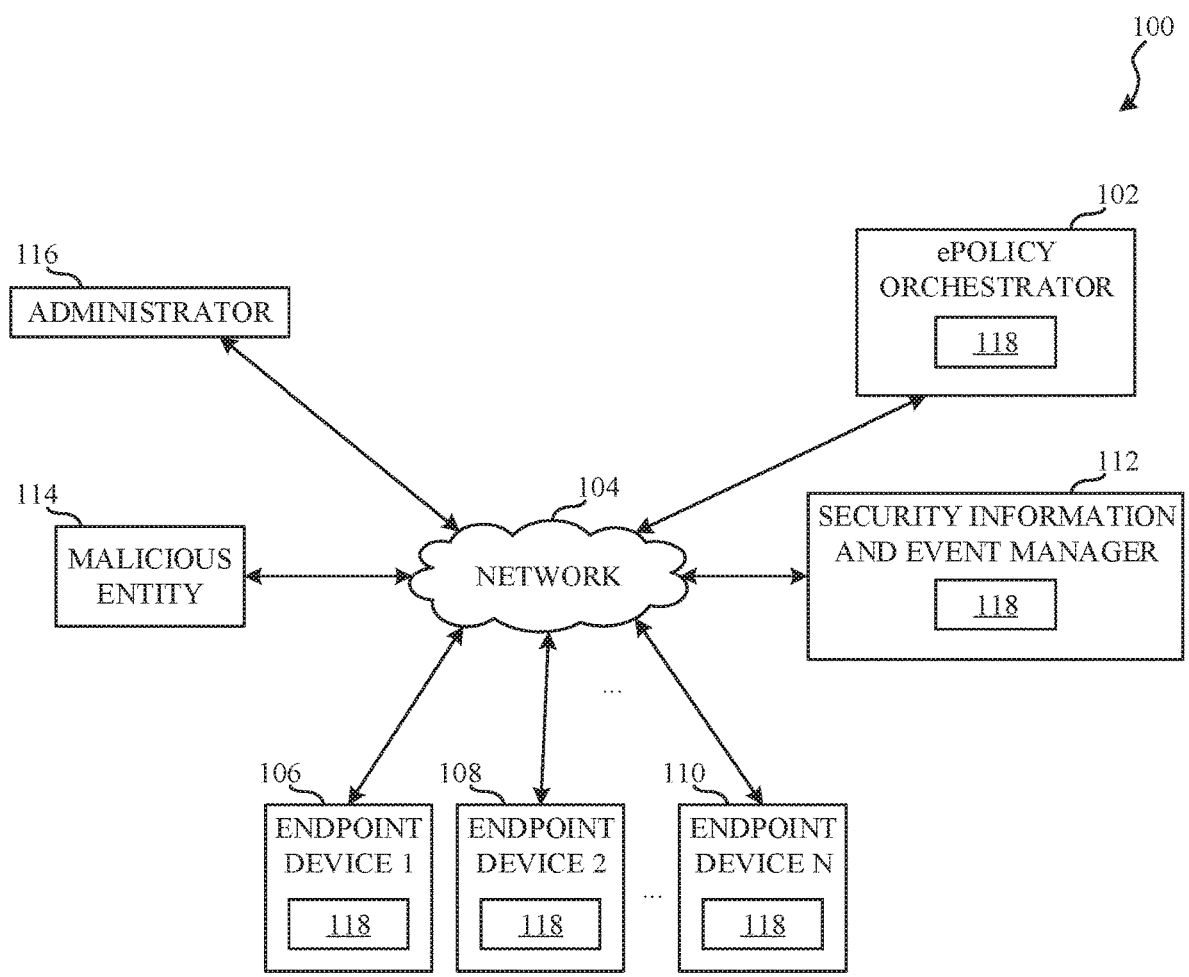
FIG. 1 is a block diagram of an example environment to securely audio communication in accordance with teachings of this disclosure.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In some computer networks, communications (e.g., network traffic) are protected from malicious activity by transport layer security (TLS). This encryption provides secure communications between sending devices and receiving devices. In some networks (e.g., networks used for businesses, corporations, homes, etc.), endpoint devices communicate with a control plane via TLS encryption. Endpoint devices include mobile phone, laptop computers, tablet computers, desktop computers, among other client devices. A control plane can be implemented by hardware, software, and/or firmware and functions to setup the network topology and/or information in a routing table that defines how to process incoming packets of information. Some communications between endpoint devices and security services correspond to publish/subscribe channels. A publish/subscribe channel can include a device (e.g., a control plane server) to which other devices (e.g., endpoint devices) subscribe. The device to which other devices are subscribed can publish communications that the other devices can then process. For example, a publish/subscribe channel is the Data Exchange Layer (DXL) provided by McAfee, LLC. The DXL leverages publish/subscribe as the core messaging paradigm.

However, in any communication mechanism where there can be multiple readers and writers, it is difficult to manage large-scale encryption mechanisms that maintain confidentiality. Further, when TLS-encrypted communications are used between endpoint devices and the control plane, and ubiquitous encryption is used for network traffic, third-party security services (e.g., monitoring tools) cannot evaluate network traffic. For example, under the current encryption paradigm, third-party security services cannot audit, apply cybersecurity forensic techniques, and/or apply machine learning models to command and control (CnC) traffic and/or other communications.

Thus, prior techniques do not provide sanctioned man-in-the-middle monitoring of various client-server communications to allow private traffic between two endpoints to be visible for legitimate security purposes. Unlike prior techniques, examples disclosed herein include generating and/or otherwise determining a shared symmetric session key for all participant devices in a secured network via an asynchronous ratchet tree group key calculation. Additionally or alternatively, examples disclosed herein generate the shared symmetric session key via a determination at the control plane server exclusive of participant endpoint devices to reduce the computational burden on endpoint devices. Sending devices of communications in the secured network sign the communication via virtual signature before transmission. Examples disclosed herein set read and write privileges for the participant devices in the secured network. In this manner, participant devices in the secured network can read the communications. However, those participant devices that directly receive the communications verify the signature of the sending device to determine whether to accept the payload over the CnC channel. If the signature of the sending device does not match with that of a sanctioned writer, examples disclosed herein prevent the receiving device of a communication from handling that communication. In this manner, the receiving device is protected from any potentially malicious content that could be located in the communication In the event that a new participant device is added to the group, examples disclosed herein generate and/or otherwise determine a new shared symmetric session key for all the participant devices including the new member device. Additionally or alternatively, examples disclosed herein generate the new shared symmetric session key via a determination at the control plane server exclusive of participant endpoint devices to reduce the computational burden on endpoint devices. In this manner, examples disclosed herein provision secured networks and onboard security appliances (e.g., security devices), thereby, providing visibility to command and control network content.

FIG. 1 is a block diagram of an example environment 100 to securely audio communications in accordance with teachings of this disclosure. The example environment 100 includes an example ePolicy orchestrator (ePO) 102, an example network 104, an example first endpoint device 106, an example second endpoint device 108, an example nth endpoint device 110, an example security information and event manager (SIEM) 112, an example malicious entity 114, and an example administrator 116. In the example of FIG. 1, the example ePO 102, the example first endpoint device 106, the example second endpoint device 108, the example nth endpoint device 110, the example SIEM 112, the example malicious entity 114, and the example administrator 116 are communicatively coupled to the example network 104.

In the illustrated example of FIG. 1, the ePO 102 is implemented by a server. In additional or alternative examples, the ePO 102 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). In the example of FIG. 1, the ePO 102 is a control plane server that manages security, streamlines and automates compliance processes, and increases overall visibility across devices (e.g., the first endpoint device 106, the second endpoint device 108, the nth endpoint device 110, etc.), networks (the network 104, etc.), and security operations. For example, the ePO 102 can enforce security policies to remediate malicious activity in a network and/or to notify an administrator (e.g., the administrator 116) of the malicious activity and provide options to remediate such activity. Additionally or alternatively, the ePO 102 transmits and/or receives communications relating to command and control (CnC) traffic to and/or from the first endpoint device 106, the second endpoint device 108, and/or the nth endpoint device 110. Further, the example ePO 102 can communicate (e.g., transmit and/or receive communications to and/or from) with the SIEM 112 regarding the security of one or more networks (e.g., the network 104).

In the illustrated example of FIG. 1, the ePO 102 provisions groups of devices that communicate via encrypted communications in the network 104. For example, the ePO 102 monitors the administrator 116 for a command to provision a group of devices in the network 104. The example ePO 102 determines whether the administrator 116 has transmitted a command to the ePO 102 to provision a group. In response to determining that the administrator 116 transmitted a command indicating to provision a group, the ePO 102 generates a participant device list 118 of devices in the group. For example, the participant device list 118 can include the ePO 102, the first endpoint device 106, the second endpoint device 108, and the nth endpoint device 110.

In the illustrated example of FIG. 1, based on a policy indicated in the command, the ePO 102 sets read and write privileges for the participant devices included on the participant device list 118. For example, the policy can indicate that (1) the ePO 102 can read and/or write messages from and/or to anyone of the first endpoint device 106, the second endpoint device 108, and the nth endpoint device 110 and (2) the first endpoint device 106, the second endpoint device 108, and the nth endpoint device 110 can read messages from the ePO 102. In other words, the example ePO 102 is a reader and/or a writer and the first endpoint device 106, the second endpoint device 108, and the nth endpoint device 110 are readers. In additional or alternative examples, the policy can indicate that any of the devices on the participant device list 118 can read and/or write messages from and/or to any of the other devices on the participant device list 118 (e.g., in the group). In additional or alternative examples, any suitable read and write privilege policy can be included in the command from the administrator 116. Additional policies can include, for example, policies that control the volume and/or rate of messages to reduce the computational burden and/or improve performance of one or more processors. Such a policy can include a set of tiers where a low level tier (e.g., a "free" tier) may only read a certain percentage of communication or a certain number of communications over a specified time period. Additionally in such an example, a higher level tier may allow increased volume and/or control.

In the illustrated example of FIG. 1, based on the command from the administrator 116, the ePO 102 determines whether to generate a shared symmetric session key for the group (e.g., a shared communication key) exclusive of participant endpoint devices or to generate the shared symmetric session key with the other participant devices. For example, the command from the administrator 116 may indicate to generate the shared communication key exclusive of participant endpoint devices if reducing the computational burden of generating the secured group and improving the security of the group is prioritized. When the example ePO 102 generates the shared communication key exclusive of participant endpoint devices, the computational burden associated with generating the shared communication key at endpoint devices is eliminated. That is, the endpoint device participant devices in the secured group do not expend any computational resources determining and/or otherwise calculating the shared communication key. Additionally or alternatively, for example, the command from the administrator 116 may indicate to generate the shared communication key with the other participant devices in the secured group if improving security of the secured group is prioritized.

In the illustrated example of FIG. 1, in response to the command indicating to generate the shared communication key exclusive of participant endpoint devices, the ePO 102 generates the shared system key (e.g., a private key) exclusive of participant endpoint devices. The example ePO 102 then transmits the shared system key and read and write privileges to the other participant devices in the secured group (e.g., the first endpoint device 106, the second endpoint device 108, the nth endpoint device 110, etc.) via a CnC channel. Optionally, if a security appliance (e.g., the SIEM 112 and/or any other security device) is included on the participant device list 118, the example ePO 102 transmits the participant device list 118 and read and write privileges to the security appliance (e.g., a security device) over a channel that is out of band from the CnC channel. In this manner, the security appliances (e.g., the SIEM 112) can generate the shared communication key using the obtained shared system key, decrypt CnC channel communications, and evaluate the same for malicious activity. Alternatively, in response to the command indicating to generate the shared communication key with the other participant devices in the secured group, the ePO 102 transmits the participant device list 118 and read and write privileges to the other participant devices in the secured group. The example ePO 102 and the other participant devices in the secured group then generate the shared communication key via an asynchronous ratchet tree group key calculation. In examples disclosed herein, the ePO 102 transmits the participant device list 118, the participant device privileges, and/or the shared system key to other participant devices in the secured group via a secure channel that is encrypted.

In the illustrated example of FIG. 1, after generating the communication group key and/or transmitting the shared system key and read and write privileges to the other participant devices (and optionally the participant device list 118 and read and write privileges to a security appliance), the ePO 102 encrypts and/or decrypts communications to and/or from the other participant devices with the shared communication key. Encrypting communications to the other participant devices with the shared communication key includes signing communications with a device identifier identifying the ePO 102.

In examples disclosed herein, generating the shared communication key using, for example, an asynchronous ratchet tree calculation which includes inputting the participant device list 118 and a private key stored locally at a participant device into a predetermined function. Based on the participant device list 118 and the private key, the participant device generates and/or otherwise generates the shared communication key. In examples disclosed herein, each participant device in a group stores a respective private key. Also, in examples disclosed herein, each private key is unique relative to other private keys in the same group. However, in other examples, private keys may not be unique. Private keys may be pre-provisioned by the ePO 102 and/or may be included in a device by an OEM of the device.

In examples disclosed herein, any suitable key generation function can be used so long as that function generates a new key as the participant devices in the group of devices changes so that participant devices that have been removed from the secured group can no longer read or write messages, and participant devices that have been added to the secured group can read subsequent messages. Such key generation functions can include private keys for each subscriber device to the secured group. However, examples disclosed herein preferable generate the shared communication key via an asynchronous ratchet tree calculation.

In the illustrated example of FIG. 1, it is possible that one or more of the participant devices in the secured group may become compromised. For example, in a secured group that includes the ePO 102, the first endpoint device 106, the second endpoint device 108, and the nth endpoint device 110, if any one of the first endpoint device 106, the second endpoint device 108, and the nth endpoint device 110 is exposed to a virus or other malicious software (e.g., on a channel out of band from the CnC channel), that endpoint device can be compromised. In the event that a participant device becomes compromised, examples disclosed herein advantageously provide a security appliance (e.g., the SIEM 112 and/or any other security device) to monitor the network traffic of the group (e.g., network traffic over the CnC channel) to identify the compromised participant device and/or to remediate the data breach.

Prior techniques that use end-to-end encryption cannot implement a security appliance, such as the example SIEM 112 disclosed herein, because no devices in the group other than the true sending device and the true receiving device interpret the communication in such prior end-to-end encryption implementations. Unlike prior techniques, examples disclosed herein implement a security appliance in the form of the SIEM 112 by configured the ePO 102 to monitor the administrator 116 for a command indicating to add one or more new member devices (e.g., the SIEM 112) to the secured group. In response to detecting a command to add a new member device to the group, the example ePO 102 adds the new member device (e.g., the SIEM 112) to the participant devices list. The example ePO 102 additionally sets the read and write privileges of the new member device. For example, in a secured group that includes the ePO 102, the first endpoint device 106, the second endpoint device 108, and the nth endpoint device 110, if the new member device is the SIEM 112, the ePO 102 sets the read and write privileges of the SIEM 112 such that the SIEM 112 can read communications (e.g., CnC communications) between the ePO 102, the first endpoint device 106, the second endpoint device 108, and the nth endpoint device 110, but that the SIEM 112 cannot write communications (e.g., CnC communications) to any of the ePO 102, the first endpoint device 106, the second endpoint device 108, and the nth endpoint device 110. The example ePO 102 sets the read and write privileges of the SIEM 112 in this manner because the SIEM 112 operates as a sanctioned man-in-the-middle to monitor and evaluate communications (e.g., CnC communications) in the secured group.

In the illustrated example of FIG. 1, after setting read and write privileges for the new member device, the ePO 102 determines whether to generate a new shared communication key exclusive of participant endpoint devices or to generate the new shared communication key with the other participant devices. In response to the command to add a new member device indicating to generate the new shared communication key exclusive of participant endpoint devices, the example ePO 102 generates the new shared communication key exclusive of participant endpoint devices. The example ePO 102 then transmits the a shared system key that can be used to generate the shared communication key and read and write privileges of the participant devices including the new member device to the other participant devices in the secured group. In examples where the new member device is a security appliance (e.g., the SIEM 112 and/or any other security device), the ePO 102 transmits the new shared system key and the read and write privileges of the participant devices including the new member device to the non-security appliance participant devices (e.g., the first endpoint device 106, the second endpoint device 108, the nth endpoint device 110, etc.) over the CnC channel and transmits the read and write privileges of the participant devices including the new member device and the updated participant device list 118 to the security appliance (e.g., the SIEM 112 and/or any other security device) over a channel out of band from the CnC channel.

In the illustrated example of FIG. 1, in response to the command to add a new member device indicating to generate the new shared communication key with the other participant devices in the secured group, the ePO 102 transmits the participant device list 118 and read and write privileges of the participant devices including the new member device to the other participant devices in the secured group. The example ePO 102 and the other participant devices then generate the new shared communication key via an asynchronous ratchet tree calculation. After generating the new shared communication key and/or transmitting a new shared system key and read and write privileges to the other participant devices (and optionally the participant device list 118 and read and write privileges to a security appliance), the ePO 102 encrypts and/or decrypts communications to and/or from the other participant devices with the new shared communication key. Encrypting communications to the other participant devices with the shared communication key includes signing communications with a device identifier identifying the ePO 102.

In some examples, the example ePO 102 implements example means for policy orchestration. The policy orchestration means is implemented by executable instructions such as that implemented by at least blocks 702, 704, 706, 708, 710, 712, 714, 715, 716, 718, 720, 722, 724, 726, 728, 730, 732, 734, 735, 736, 738, 740, and 742 of FIG. 7. The executable instructions of blocks 702, 704, 706, 708, 710, 712, 714, 715, 716, 718, 720, 722, 724, 726, 728, 730, 732, 734, 735, 736, 738, 740, and 742 of FIG. 7 may be executed on at least one processor such as the example processor 1012 of FIG. 10. In other examples, the policy orchestration means is implemented by hardware logic, hardware implemented state machines, logic circuitry, and/or any other combination of hardware, software, and/or firmware.

In the illustrated example of FIG. 1, the network 104 is the Internet. However, the example network 104 may be implemented using any suitable wired and/or wireless network(s) including, for example, one or more data buses, one or more Local Area Networks (LANs), one or more wireless LANs, one or more cellular networks, one or more private networks, one or more public networks, etc. In additional or alternative examples, the network 104 is an enterprise network (e.g., within businesses, corporations, etc.), a home network, among others. The example network 104 enables the ePO 102, the first endpoint device 106, the second endpoint device 108, the nth endpoint device 110, the SIEM 112, and the administrator 116 to communicate depending on whether the ePO 102 has provisioned a secured group and/or the read and write privileges of the ePO 102, the first endpoint device 106, the second endpoint device 108, the nth endpoint device 110, the SIEM 112, and the administrator 116. As used herein, the phrase "in communication," including variances therefore (e.g., communicate, communicatively coupled, etc.), encompasses direct communication and/or indirect communication through one or more intermediary components and does not require direct physical (e.g., wired) communication and/or constant communication, but rather includes selective communication at periodic or aperiodic intervals, as well as one-time events.

Additionally, because the network 104 places the ePO 102, the first endpoint device 106, the second endpoint device 108, the nth endpoint device 110, the SIEM 112, and the administrator 116 in communication, communication through the example network 104 can expose any one of the ePO 102, the first endpoint device 106, the second endpoint device 108, the nth endpoint device 110, the SIEM 112, and the administrator 116 to being impacted by the malicious entity 114. However, by establishing a secured group and/or adding the SIEM 112 and/or any other security appliance to the secured group, the example ePO 102 prevents security threats, data beaches, and/or further corruption of devices in the secured group.

For the sake of clarity, the structure and functionality of the example first endpoint device 106, the example second endpoint device 108, the example nth endpoint device 110, and the example SIEM 112 will be discussed with respect to the first endpoint device 106. However, the structure and functionality of the example first endpoint device 106, the example second endpoint device 108, the example nth endpoint device 110, and the example SIEM 112 is not limited thereto. For example, the SIEM 112 is implemented by a server that is configured to monitor communications in a network (e.g., the network 104) for malicious activity. In some examples disclosed herein, the SIEM 112 is referred to as a security information and event management server. Additional detail concerning the SIEM 112 will be discussed hereinbelow.

In the illustrated example of FIG. 1, the first endpoint device 106 is implemented by a laptop computer. However, in additional or alternative examples, the example first endpoint device 106 can be implemented by a mobile phone, a tablet computer, a desktop computer, a server, among others. In the example of FIG. 1, the first endpoint device 106 monitors the network 104 for communications concerning group provisioning. In response to detecting a communication concerning group provisioning, the example first endpoint device 106 determines whether the communication (e.g., a CnC channel communication for endpoint devices) includes a shared system key (e.g., for generating a shared communication key). In response to determining that the communication does not include a shared system key, the example first endpoint device 106 determines whether the communication includes a participant device list. In response to determining that the communication includes a participant device list, the first endpoint device 106 generates a shared communication key with the other participant devices.

In the illustrated example of FIG. 1, after generating the shared communication key (e.g., based on the shared system key or the participant device list), the first endpoint device 106 stores the generated shared communication key. Additionally, the example first endpoint device 106 stores the participant device read and write privileges (e.g., the first endpoint device 106 is configured to store read and write privileges for the participant devices) included in the communication. Additionally, the example first endpoint device 106 stores the participant device list 118, if provided. For example, the first endpoint device 106 can store the participant device list 118 as a copy of the participant list 118 generated at the ePO 102. After generating and/or storing the shared communication key, the participant device read and write privileges, and/or the participant device list 118, the example first endpoint device 106 encrypts and/or decrypts communication to and/or from the other participant devices with the shared communication key. Encrypting communications to other participant devices with the shared communication key includes signing communications with a device identifier identifying the first endpoint device 106.

In the illustrated example of FIG. 1, after being added to a group (e.g., after detecting and processing a communication concerning provisioning a secured group), the first endpoint device 106 monitors for communications (e.g., a CnC channel communication for endpoint devices) concerning adding new group member devices. For example, a new member device can include the SIEM 112. In response to detecting a communication concerning adding new group member devices, the example first endpoint device 106 determines whether the communication includes a new shared system key (e.g., to generate a new shared communication key). In response to determining that the communication does not include a new shared system key and/or any group key, the first endpoint device 106 determines whether the communication includes an updated participant device list. In response to determining that the communication includes an updated participant device list, the first endpoint device 106 generates a new shared communication key with the other participant devices.

In the illustrated example of FIG. 1, after generating the new shared communication key, the first endpoint device 106 stores the new shared communication key. Additionally, the first endpoint device 106 stores the new participant device read and write privileges included in the communication (e.g., the read and write privileges of the participant devices including the new member device(s)). Additionally, the example first endpoint device 106 stores the participant device list 118, if provided. After generating and/or storing the new shared communication key and new participant device read and write privileges, the example first endpoint device 106 encrypts and/or decrypts communication to and/or from the other participant devices with the new shared communication key. Encrypting communications to other participant devices with the new shared communication key includes signing communications with a device identifier identifying the first endpoint device 106.

In the illustrated example of FIG. 1, the first endpoint device 106 additionally or alternatively monitors the network 104 for communications from other devices. In response to detecting a communication, the first endpoint device 106 accesses the identity of the sending device of the communication. For example, the first endpoint device 106 accesses the device identifier of the device that transmitted the communication to the first endpoint device 106. The example first endpoint device 106 determines whether the identity of the sending device corresponds to a writer in the participant device privileges. For example, the first endpoint device 106 determines whether the read and write privileges (e.g., a list of device identifiers associated with read and write privileges) include the device identifier as a writer. In other words, the first endpoint device 106 determines whether the ePO 102 has configured the device that transmitted the communication to be a writer.

In the illustrated example of FIG. 1, in response to determining that the identity of the sending device corresponds to a writer in the participant device privileges, the first endpoint device 106 handles the communication. In response to determining that the identity of the sending device does not correspond to a writer in the participant device privileges, the first endpoint device 106 ignores the communication. In the event that the device (e.g., the malicious entity 114) that transmitted the communication is not included on the participant device privileges list (e.g., not included on the participant device list 118), the first endpoint device 106 determines that the identity of the sending device does not correspond to a writer and ignores the communication.

In some examples, the example first endpoint device 106 implements example means for endpoint policy enforcement. The endpoint policy enforcement means is implemented by executable instructions such as that implemented by at least blocks 802, 804, 806, 808, 810, 812, 814, 816, 818, 820, 822, 824, 826, 828, and 830 of FIG. 8 and/or block 902, 904, 906, 908, 910, 912, and 914 of FIG. 9. The executable instructions of blocks 802, 804, 806, 808, 810, 812, 814, 816, 818, 820, 822, 824, 826, 828, and 830 of FIG. 8 and/or block 902, 904, 906, 908, 910, 912, and 914 of FIG. 9 may be executed on at least one processor such as the example processor 1112 of FIG. 11. In other examples, the endpoint policy enforcement means is implemented by hardware logic, hardware implemented state machines, logic circuitry, and/or any other combination of hardware, software, and/or firmware.

In the illustrated example of FIG. 1, the SIEM 112 is implemented by a server. In additional or alternative examples, the SIEM 112 can be implemented by one or more analog or digital circuit(s), logic circuits, programmable processor(s), programmable controller(s), GPU(s), DSP(s), ASIC(s), PLD(s) and/or FPLD(s). The example SIEM 112 is a security appliance configured to monitor network communications (e.g., communications over the network 104) as a sanctioned man-in-the-middle in order to detect malicious activity.

As discussed above, for the sake of clarity, the structure and functionality of the example first endpoint device 106, the example second endpoint device 108, the example nth endpoint device 110, and the example SIEM 112 has been discussed with respect to the first endpoint device 106. However, the structure and functionality of the example first endpoint device 106, the example second endpoint device 108, the example nth endpoint device 110, and the example SIEM 112 is not limited thereto.

As such, in the example of FIG. 1, the SIEM 112 monitors the network 104 for communications (e.g., non-CnC channel communications for security appliances) concerning group provisioning. Typically, such communications to the SIEM 112 will not include a shared system key. Even so, in some examples, in response to detecting a communication concerning group provisioning, the SIEM 112 determines whether the communication includes a shared system key. In response to determining that the communication does not include a shared system key, the example SIEM 112 determines whether the communication includes a participant device list (e.g., the participant list 118). Typically, such communications to the example SIEM 112 will include a participant device list. In response to determining that the communication includes a participant device list, the example SIEM 112 generates a shared communication key with the other participant devices.

In the illustrated example of FIG. 1, after generating the shared communication key, the SIEM 112 stores the shared communication key. Additionally, the example SIEM 112 stores the participant device read and write privileges included in the communication and the participant device list 118, if provided. After generating and/or storing the shared communication key, the participant device read and write privileges, and/or the participant device list 118, the example SIEM 112 decrypts communications (e.g., CnC channel communication) to and/or from the other participant devices (e.g., endpoint devices) and the ePO 102 with the shared communication key.

In the illustrated example of FIG. 1, after being added to a group (e.g., after detecting and processing a communication concerning provisioning a secured group), the SIEM 112 monitors for communications (e.g., a non-CnC channel communication for security appliances) concerning adding new group member devices. For example, a new member device can include another endpoint device. In response to detecting a communication concerning adding new group member devices, the example ePO 102 determines whether the communication includes a new shared system key. Typically, such communications to the example SIEM 112 will not include a new shared system key (e.g., for generating a new shared communication key). Even so, in some examples, in response to detecting a communication concerning group provisioning, the example SIEM 112 determines whether the communication includes a new shared system key. In response to determining that the communication does not include a new shared system key, the example SIEM 112 determines whether the communication includes an updated participant device list. Typically, such communications to the example SIEM 112 will include a participant device list.

In the illustrated example of FIG. 1, after generating the new shared communication key (e.g., based on the new shared system key or the updated participant device list), the example SIEM 112 stores the new shared communication key. Additionally, the example SIEM 112 stores the new participant device read and write privileges included in the communication (e.g., the read and write privileges of the participant devices including the new member device(s)). Additionally, the example SIEM 112 stores the participant device list 118. After generating and/or storing the new shared communication key and new participant device read and write privileges, the example SIEM 112 decrypts communications (e.g., CnC channel communication) to and/or from the other participant devices (e.g., endpoint devices) and the ePO 102 with the new shared communication key.

In some examples, the example SIEM 112 implements example means for monitoring network communication. The network communication monitoring means is implemented by executable instructions such as that implemented by at least blocks 802, 804, 806, 808, 810, 812, 814, 816, 818, 820, 822, 824, 826, 828, and 830 of FIG. 8 and/or block 902, 904, 906, 908, 910, 912, and 914 of FIG. 9. The executable instructions of blocks 802, 804, 806, 808, 810, 812, 814, 816, 818, 820, 822, 824, 826, 828, and 830 of FIG. 8 and/or block 902, 904, 906, 908, 910, 912, and 914 of FIG. 9 may be executed on at least one processor such as the example processor 1112 of FIG. 11. In other examples, the network communication monitoring means is implemented by hardware logic, hardware implemented state machines, logic circuitry, and/or any other combination of hardware, software, and/or firmware.

In the illustrated example of FIG. 1, the malicious entity 114 is an entity that is a malicious actor perpetuating an attack on at least some of the ePO 102, the first endpoint device 106, the second endpoint device 108, the nth endpoint device 110, and/or the SIEM 112. For example, the malicious entity 114 can transmit, communicate with, activate, and/or host malware that targets at least some of the ePO 102, the first endpoint device 106, the second endpoint device 108, the nth endpoint device 110, and/or the SIEM 112. For example, the malware can include computer viruses, computer worms, trojan viruses, rootkits, adware, spyware, bots, file-less malware, ransomware, ghost mining, and/or any other type of malicious software, code, programs, etc. In the example of FIG. 1, the malicious entity 114 is implemented by at least one computing device (e.g., a laptop, a server, etc.) that communicates with at least some of the ePO 102, the first endpoint device 106, the second endpoint device 108, the nth endpoint device 110, and/or the SIEM 112. While illustrated as a single entity, in some examples, the malicious entity 114 can be implemented by a number of computers. In some examples, the malicious entity 114 can be distributed between many computers. In additional or alternative examples, the example malicious entity 114 can be geographically diverse (e.g., multiple computers located across different geographic locations). In other examples, the malicious entity 114 can include multiple parties working in conjunction with one another.

In the illustrated example of FIG. 1, the administrator 116 is implemented as a server. In additional or alternative examples, the administrator 116 can be implemented by one or more analog or digital circuit(s), logic circuits, programmable processor(s), programmable controller(s), GPU(s), DSP(s), ASIC(s), PLD(s) and/or FPLD(s). In some examples, the administrator 116 can be a human being who is in charge of the network security of an enterprise. In the example of FIG. 1, the administrator 116 transmits commands to the ePO 102 to provision a secured group within the network 104 and/or add member devices to the secured group. For example, a command to provision a secured group can include a listing of devices to include in the group, a policy for read and write privileges of the devices in the secured group, and/or whether to generate a shared communication key for the secured group at the ePO 102 exclusive of participant endpoint devices or to generate the shared communication key with the other member devices of the secured group.

In the illustrated example of FIG. 1, the ePO 102 leverages channel encryption based on ratchet trees to protect the data between the participant devices in the secured group that are sending and receiving CnC communications. Examples disclosed herein utilize ratchet trees securely synchronize encryption keys between more than two parties. Examples disclosed herein can add parties as needed and can authorize additional sanctioned listeners (e.g., security appliances, the SIEM 112, etc.) that are able to decipher the traffic.

Figure 2:
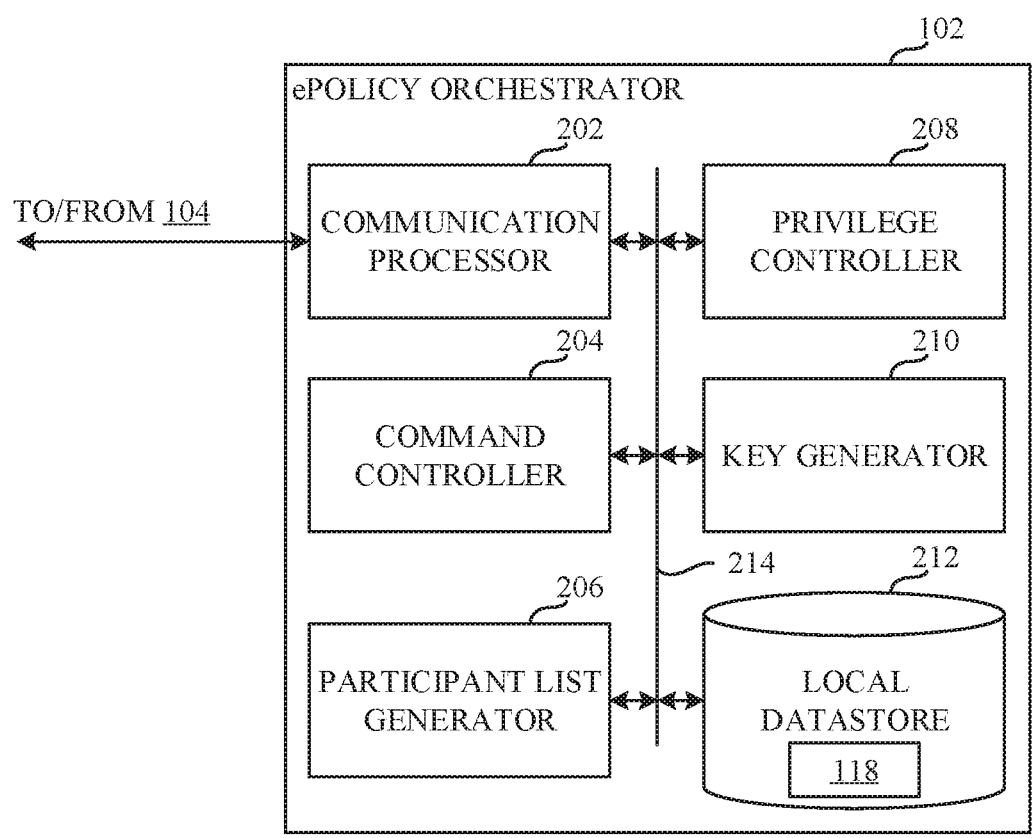
FIG. 2 is a block diagram of the example ePolicy Orchestrator of FIG. 1.

FIG. 2 is a block diagram of the example ePolicy orchestrator (ePO) 102 of FIG. 1. The example ePO 102 of FIG. 2 includes an example communication processor 202, an example command controller 204, an example participant list generator 206, an example privilege controller 208, an example key generator 210, and an example local datastore 212. In the example of FIG. 2, any of the communication processor 202, the command controller 204, the participant list generator 206, the privilege controller 208, the key generator 210, and/or the local datastore 212 can communicate via an example communication bus 214. In examples disclosed herein, the communication bus 214 may be implemented using any suitable wired and/or wireless communication. In additional or alternative examples, the communication bus 214 includes software, machine readable instructions, and/or communication protocols by which information is communicated among the communication processor 202, the command controller 204, the participant list generator 206, the privilege controller 208, the key generator 210, and/or the local datastore 212.

In the illustrated example of FIG. 2, the communication processor 202 is implemented by a network interface controller. In additional or alternative examples, the communication processor 202 can be implemented by one or more analog or digital circuit(s), logic circuits, programmable processor(s), programmable controller(s), GPU(s), DSP(s), ASIC(s), PLD(s) and/or FPLD(s). The example communication processor 202 functions as a network interface configured to communicate with other devices in a network (e.g., the network 104) with a designated physical and data link layer standard (e.g., Ethernet or Wi-Fi).

In the illustrated example of FIG. 2, when operating in a secured group, the communication processor 202 encrypts communications to other participant devices in the group and/or decrypts communications from other participant devices in the group using the shared communication key. In some examples, the example communication processor 202 implements example means for processing communications. The communication processing means is implemented by executable instructions such as that implemented by at least blocks 720 and 740 of FIG. 7. The executable instructions of blocks 720 and 740 of FIG. 7 may be executed on at least one processor such as the example processor 1012 of FIG. 10. In other examples, the communication processing means is implemented by hardware logic, hardware implemented state machines, logic circuitry, and/or any other combination of hardware, software, and/or firmware.

In the illustrated example of FIG. 2, the command controller 204 is implemented by a controller. In additional or alternative examples, the command controller 204 can be implemented by one or more analog or digital circuit(s), logic circuits, programmable processor(s), programmable controller(s), GPU(s), DSP(s), ASIC(s), PLD(s) and/or FPLD(s). The example command controller 204 is configured to interpret commands received (e.g., reception of commands) at the ePO 102. For example, the command controller 204 interprets commands from the administrator 116.

In the illustrated example of FIG. 2, the command controller 204 monitors the network 104 for commands to provision a group (e.g., a provisioning command). For example, the command controller 204 can periodically or a-periodically monitor the administrator 116 for a command to provision a group. Additionally or alternatively, when the example ePO 102 receives a communication, the command controller 204 determines whether the communication includes a command to provision a group. When the example command controller 204 determines that a communication includes a command to provision a group, the command controller 204 determines whether the command indicates to generate the shared communication key exclusive of participant endpoint devices or to generate the shared communication key with the other participant devices in the secured group.

In the illustrated example of FIG. 2, when the command indicates to generate the shared communication key exclusive of participant endpoint devices, the command controller 204 transmits, via the communication processor 202, a shared system key that can be used to generate the shared communication key (e.g., determined by the key generator 210) and the participant device read and write privileges (e.g., set by the privilege controller 208 based on a policy indicated in the command) to the non-security appliance participant devices in the secured group (e.g., endpoint devices). Optionally, when the command indicates to generate the shared communication key exclusive of participant endpoint devices, if any security appliances are included in the secured group, the example command controller 204 transmits the participant device list and the participant device read and write privileges to the security appliances. When the command indicates to generate the shared communication key with the other participant devices in the secured group, the example command controller 204 transmits, via the communication processor 202, the participant devices list (e.g., generated by the participant list generator 206) and the participant devices read and write privileges (e.g., set by the privilege controller 208 based on a policy indicated in the command).

In the illustrated example of FIG. 2, the command controller 204 additionally or alternatively monitors the network 104 for commands to add one or more new member devices to the secured group. For example, the command controller 204 can periodically or a-periodically monitor the administrator 116 for a command to add one or more new member devices to the secured group. When the example ePO 102 receives a communication, the command controller 204 determines whether the communication includes a command to add one or more new member devices to the secured group. When the example command controller 204 determines that a communication includes a command to add one or more new member devices to the group, the command controller 204 determines whether the command indicates to generate the new shared communication key exclusive of participant endpoint devices or to generate the new shared communication key with the other participant devices in the secured group.

In the illustrated example of FIG. 2, when the command indicates to generate the new shared communication key exclusive of participant endpoint devices, the command controller 204 transmits, via the communication processor 202, the new shared system key (e.g., determined by the key generator 210) and the updated participant device read and write privileges (e.g., set by the privilege controller 208 based on a policy indicated in the command) to the other participant devices in the secured group. Optionally, when the command indicates to generate the new shared communication key exclusive of participant endpoint devices, if any security appliances are included in the secured group, the example command controller 204 transmits the participant device list and the participant device read and write privileges to the security appliances. When the command indicates to generate the new shared communication key with the other participant devices in the secured group, the example command controller 204 transmits, via the communication processor 202, the updated participant devices list (e.g., generated by the participant list generator 206) and the updated participant devices read and write privileges (e.g., set by the privilege controller 208 based on a policy indicated in the command) to the other participant devices.

In some examples, the example command controller 204 implements example means for controlling based on commands. The command-based controlling means is implemented by executable instructions such as that implemented by at least blocks 702, 704, 710, 714, 715, 716, 722, 724, 730, 734, 735, 736, and 742 of FIG. 7. The executable instructions of blocks 702, 704, 710, 714, 715, 716, 722, 724, 730, 734, 735, 736, and 742 of FIG. 7 may be executed on at least one processor such as the example processor 1012 of FIG. 10. In other examples, the command-based controlling means is implemented by hardware logic, hardware implemented state machines, logic circuitry, and/or any other combination of hardware, software, and/or firmware.

In the illustrated example of FIG. 2, the participant list generator 206 is implemented by a controller. In additional or alternative examples, the participant list generator 206 can be implemented by one or more analog or digital circuit(s), logic circuits, programmable processor(s), programmable controller(s), GPU(s), DSP(s), ASIC(s), PLD(s) and/or FPLD(s). The example participant list generator 206 is configured to generate and/or update a participant device list for a secured group based on commands received at the ePO 102.

In the illustrated example of FIG. 2, in response to the command controller 204 determining that the ePO 102 has received a command to provision a secured group, the participant list generator 206 generates a participant device list. Additionally or alternatively, in response to the command controller 204 determining that the ePO 102 has received a command to add one or more new member devices to the secured group, the example participants list generator 206 adds the new member device(s) to the participant device list to generate an updated participant device list.

In some examples, the example participant list generator 206 implements example means for generating participant lists. The participant list generating means is implemented by executable instructions such as that implemented by at least blocks 706 and 726 of FIG. 7. The executable instructions of blocks 706 and 726 of FIG. 7 may be executed on at least one processor such as the example processor 1012 of FIG. 10. In other examples, the participant list generating means is implemented by hardware logic, hardware implemented state machines, logic circuitry, and/or any other combination of hardware, software, and/or firmware.

In the illustrated example of FIG. 2, the privilege controller 208 is implemented by a controller. In additional or alternative examples, the example privilege controller 208 can be implemented by one or more analog or digital circuit(s), logic circuits, programmable processor(s), programmable controller(s), GPU(s), DSP(s), ASIC(s), PLD(s) and/or FPLD(s). The example privilege controller 208 is configured to set read and right privileges for participant devices in the secured group based on a policy indicated in commands received at the ePO 102. For example, the privilege controller 208 can parse a command received at the ePO 102 for a policy to determine the read and write privileges to apply to the participant devices in the secured group.

In the illustrated example of FIG. 2, when the command controller 204 determines that the ePO 102 has received a command to provision a secured group, the privilege controller 208 sets the read and write privileges for the participant devices in the group. Additionally or alternatively, when the command controller 204 determines that the ePO 102 has received a command to add one or more new member devices to the secured group, the example privilege controller 208 sets the read and write privileges for the one or more new member devices in the secured group. Additionally or alternatively, the example privilege controller 208 updates the read and write privileges of any of the other member devices of the secured group based on the policy included in the command.

In some examples, the example privilege controller 208 implements example means for controlling privileges. The privilege controlling means is implemented by executable instructions such as that implemented by at least blocks 708 and 728 of FIG. 7. The executable instructions of blocks 708 and 728 of FIG. 7 may be executed on at least one processor such as the example processor 1012 of FIG. 10. In other examples, the privilege controlling means is implemented by hardware logic, hardware implemented state machines, logic circuitry, and/or any other combination of hardware, software, and/or firmware.

In the illustrated example of FIG. 2, the key generator 210 is implemented by a controller. In additional or alternative examples, the key generator 210 can be implemented by one or more analog or digital circuit(s), logic circuits, programmable processor(s), programmable controller(s), GPU(s), DSP(s), ASIC(s), PLD(s) and/or FPLD(s). The example key generator 210 is configured to generate the shared symmetric session key (e.g., shared communication key) for all participants in the secured group. In some examples, the key generator 210 is configured to generate a shared system key that can be used by another device to generate the symmetric session key (e.g., the shared communication key).

In the illustrated example of FIG. 2, in response to the command controller 204 determining that the command indicates to generate the shared communication key exclusive of participant endpoint devices, the key generator 210 generates the shared symmetric session key via an asynchronous ratchet tree group key calculation. When the command controller 204 determines that the command indicates to generate the shared symmetric session key with the other participant devices, the example key generator 210 generates the shared communication key and/or the shared system key corresponding to the shared communication key with the other participant devices via an asynchronous ratchet tree group key calculation. As described above, the example key generator 210 calculates the shared communication key and/or the shared system key based on the participant device list and a private key associated with the ePO 102.

In the illustrated example of FIG. 2, in response to the command controller 204 determining that the command indicates to generate the new shared communication key exclusive of participant endpoint devices, the key generator 210 generates the new shared communication key via an asynchronous ratchet tree group key calculation. When the command controller 204 determines that the command indicates to generate the new shared communication key and/or the new shared system key with the other participant devices, the example key generator 210 generates the new shared communication key and/or the new shared system key with the other participant devices via an asynchronous ratchet tree group key calculation. As described above, the key generator 210 calculates the new shared communication key and/or the new shared system key based on the participant device list and a private key associated with the ePO 102.

In some examples, the example key generator 210 implements example means for generating cryptographic keys. The cryptographic key generating means is implemented by executable instructions such as that implemented by at least blocks 712, 718, 732, and 738 of FIG. 7. The executable instructions of blocks 712, 718, 732, and 738 of FIG. 7 may be executed on at least one processor such as the example processor 1012 of FIG. 10. In other examples, the cryptographic key generating means is implemented by hardware logic, hardware implemented state machines, logic circuitry, and/or any other combination of hardware, software, and/or firmware.

In the illustrated example of FIG. 2, the local datastore 212 is configured to record data (e.g., obtained information, commands, policies, read and write privileges, etc.). For example, the local datastore 212 can store one or more files indicative of commands, read and write policies, participant devices lists (e.g., the participant device list 118), participant device read and write privileges, cryptographic keys (e.g., the shared communication key, a private key associated with the ePO 102, etc.), among others.

In the illustrated example of FIG. 2, the local datastore 212 may be implemented by a volatile memory (e.g., a Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The example local datastore 212 may additionally or alternatively be implemented by one or more double data rate (DDR) memories, such as DDR, DDR2, DDR3, DDR4, mobile DDR (mDDR), etc. The example local datastore 212 may additionally or alternatively be implemented by one or more mass storage devices such as hard disk drive(s), compact disk drive(s), digital versatile disk drive(s), solid-state disk drive(s), etc. While in the illustrated example the local datastore 212 is illustrated as a single database, the local datastore 212 may be implemented by any number and/or type(s) of databases. Furthermore, the data stored in the local datastore 212 may be in any data format such as, for example, binary data, comma delimited data, tab delimited data, structured query language (SQL) structures, etc.

Figure 3:
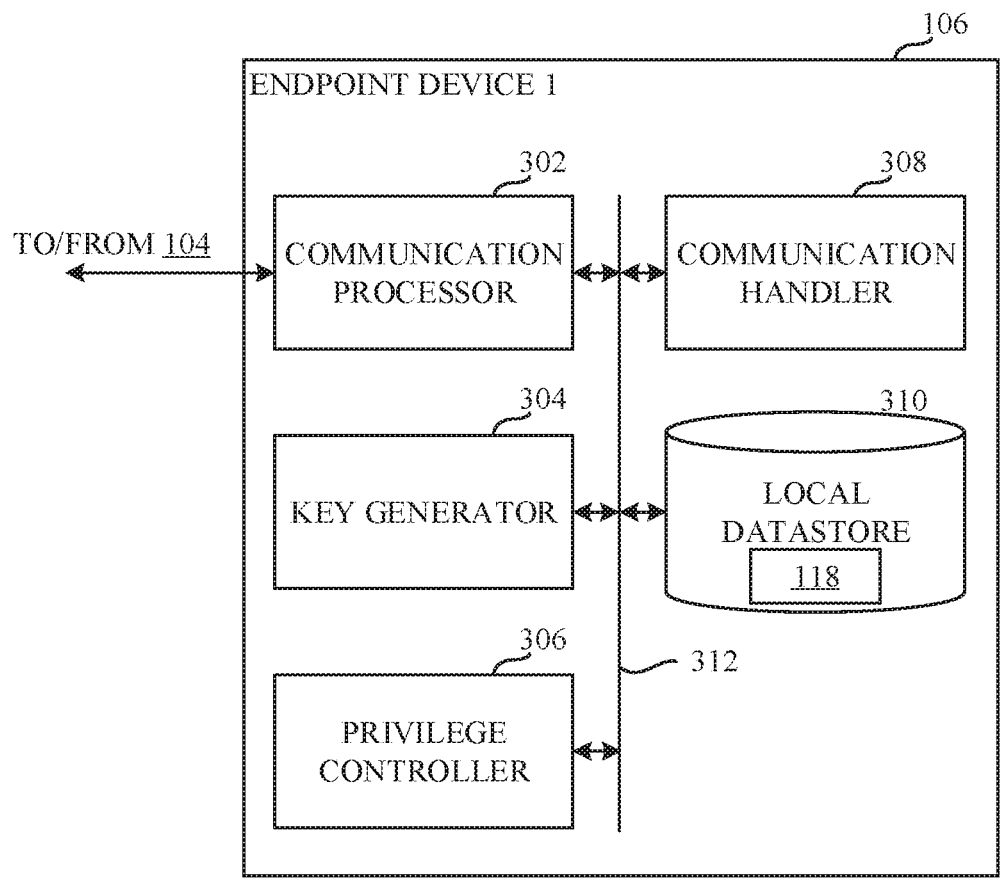
FIG. 3 is a block diagram of the example first endpoint device of FIG. 1.

FIG. 3 is a block diagram of the example first endpoint device 106 of FIG. 1. The example first endpoint device 106 of FIG. 3 includes an example communication processor 302, an example key generator 304, an example privilege controller 306, an example communication handler 308, and an example local datastore 310. In the example of FIG. 3, any of the communication processor 302, the key generator 304, the privilege controller 306, the communication handler 308, and/or the local datastore 310 can communicate via an example communication bus 312. In examples disclosed herein, the communication bus 312 may be implemented using any suitable wired and/or wireless communication. In additional or alternative examples, the communication bus 312 includes software, machine readable instructions, and/or communication protocols by which information is communicated among the communication processor 302, the key generator 304, the privilege controller 306, the communication handler 308, and/or the local datastore 310.

In the illustrated example of FIG. 3, the communication processor 302 is implemented by a network interface controller. In additional or alternative examples, the communication processor 302 can be implemented by one or more analog or digital circuit(s), logic circuits, programmable processor(s), programmable controller(s), GPU(s), DSP(s), ASIC(s), PLD(s) and/or FPLD(s). The example communication processor 302 functions as a network interface configured to communicate with other devices in a network (e.g., the network 104) with a designated physical and data link layer standard (e.g., Ethernet or Wi-Fi).

In the illustrated example of FIG. 3, the communication processor 302 monitors the network 104 for communications related to group provisioning. In response to detecting a communication, the example communication processor 302 determines whether the communication includes a shared system key. Additionally or alternatively, the example communication processor 302 determines whether the communication includes a participant device list. As described above, when the example communication processor 302, the example key generator 304, the example privilege controller 306, the example communication handler 308, the example local datastore 310, and/or the example communication bus 312 implement the SIEM 112, typically, such communications to the SIEM 112 will not include a shared system key and will typically include a participant device list.

In the illustrated example of FIG. 3, the communication processor 302 monitors the network 104 for communications related to adding new member devices to a secured group. In response to detecting a communication, the example communication processor 302 determines whether the communication includes a new shared system key. Additionally or alternatively, the example communication processor 302 determines whether the communication includes an updated participant device list. As described above, when the example communication processor 302, the example key generator 304, the example privilege controller 306, the example communication handler 308, the example local datastore 310, and/or the example communication bus 312 implement the SIEM 112, typically, such communications to the SIEM 112 will not include a new shared system key and will typically include an updated participant device list. Additionally, the example communication processor 302 encrypts communications (e.g., the communication processor 302 is configured to encrypt communications) to other participant devices in the group and/or decrypts communications from other participant devices in the group using a shared communication key (e.g., generated based on the shared system key).

In the illustrated example of FIG. 3, the communication processor 302 monitors for any other communications (e.g., communications not related to provisioning a group and/or adding new member devices to a group). In response to detecting a communication, the example communication processor 302 accesses the identity of the sending device. For example, the communication processor 302 accesses the device identifier of the device that transmitted the communication to the first endpoint device 106.

In the illustrated example of FIG. 3, the communication processor 302 determines whether the identity of the sending device corresponds to a writer in the participant device privileges. For example, the communication processor 302 determines whether the read and write privileges include the device identifier as a writer. In other words, the example communication processor 302 determines whether the ePO 102 has configured the device that transmitted the communication to be a writer.

In some examples, the example communication processor 302 implements example means for processing communications. The communication processing means is implemented by executable instructions such as that implemented by at least blocks 802, 804, 806, 814, 816, 818, 820, 828, and 830 of FIG. 8 and/or blocks 902, 904, 906, 908, and 914 of FIG. 9. The executable instructions of blocks 802, 804, 806, 814, 816, 818, 820, 828, and 830 of FIG. 8 and/or blocks 902, 904, 906, 908, and 914 of FIG. 9 may be executed on at least one processor such as the example processor 1112 of FIG. 11. In other examples, the communication processing means is implemented by hardware logic, hardware implemented state machines, logic circuitry, and/or any other combination of hardware, software, and/or firmware.

In the illustrated example of FIG. 3, the key generator 304 is implemented by a controller. In additional or alternative examples, the key generator 304 can be implemented by one or more analog or digital circuit(s), logic circuits, programmable processor(s), programmable controller(s), GPU(s), DSP(s), ASIC(s), PLD(s) and/or FPLD(s). The example key generator 304 is configured to store and/or generate the shared symmetric session key (e.g., shared communication key and/or shared system key) for all participant devices in the secured group.

In the illustrated example of FIG. 3, in response to the communication processor 302 determining that a communication related to provisioning includes a shared system key, the key generator 304 generates a shared communication key (e.g., based on the shared system key) and stores the shared system key and/or the shared communication key. In response to the communication processor 302 determining that the communication related to provisioning includes a participant devices list, the example key generator 304 generates the shared communication key with the other participant devices via an asynchronous ratchet tree group key calculation. As described above, the example key generator 304 calculates the shared communication key based on the participant device list and a private key associated with the first endpoint device 106.

In the illustrated example of FIG. 3, in response to the communication processor 302 determining that a communication related to adding new member devices includes a new shared system key (e.g., corresponding to a new shared communication key), the key generator 304 generated the new shared communication key based on the new shared system key and stores the new shared communication key and/or the new shared system key. In response to the communication processor 302 determining that a communication related adding new member devices includes an updated participant device list, the example key generator 304 generates the new shared communication key with the other participant devices via an asynchronous ratchet tree group key calculation. As described above, the example key generator 304 calculates the shared communication key based on the participant device list and a private key associated with the first endpoint device 106.

In some examples, the example key generator 304 implements example means for generating cryptographic keys. The cryptographic key generating means is implemented by executable instructions such as that implemented by at least blocks 808, 810, 822, and 824 of FIG. 8. The executable instructions of blocks 808, 810, 822, and 824 of FIG. 8 may be executed on at least one processor such as the example processor 1112 of FIG. 11. In other examples, the cryptographic key generating means is implemented by hardware logic, hardware implemented state machines, logic circuitry, and/or any other combination of hardware, software, and/or firmware.

In the illustrated example of FIG. 3, the privilege controller 306 is implemented by a controller. In additional or alternative examples, the example privilege controller 306 can be implemented by one or more analog or digital circuit(s), logic circuits, programmable processor(s), programmable controller(s), GPU(s), DSP(s), ASIC(s), PLD(s) and/or FPLD(s). The example privilege controller 306 is configured to set read and right privileges for participant devices in the secured group based on the read and write privileges received from the ePO 102.

In the illustrated example of FIG. 3, after the key generator 304 stores the shared communication key (e.g., after generating the shared communication key with the participating devices and/or from the shared system key), the privilege controller 306 stores the participant device privileges. Additionally or alternatively, after the key generator 304 stores the new shared communication key (e.g., either after generating the new shared communication key), the example privilege controller 306 stores the updated participant device privileges. The example privilege controller 306 additionally stores the participant device list.

In some examples, the example privilege controller 306 implements example means for controlling privileges. The privilege controlling means is implemented by executable instructions such as that implemented by at least blocks 812 and 826 of FIG. 8. The executable instructions of blocks 812 and 826 of FIG. 8 may be executed on at least one processor such as the example processor 1112 of FIG. 11. In other examples, the privilege controlling means is implemented by hardware logic, hardware implemented state machines, logic circuitry, and/or any other combination of hardware, software, and/or firmware.

In the illustrated example of FIG. 3, the communication handler 308 is implemented by a controller. In additional or alternative examples, the communication handler 308 can be implemented by one or more analog or digital circuit(s), logic circuits, programmable processor(s), programmable controller(s), GPU(s), DSP(s), ASIC(s), PLD(s) and/or FPLD(s). The example communication handler 308 is configured operate on communications received at the first endpoint device 106.

In the illustrated example of FIG. 3, in response to the communication processor 302 determining that the identity of the sending device corresponds to a writer in the participant device privileges, the communication handler 308 handles and/or otherwise processes the communication. For example, if the communication includes data packets related to a workload, the example communication handler 308 processes the workload. In response to the communication processor 302 determining that the identity of the sending device does not correspond to a writer in the participant device privileges, the example communication handler 308 ignores and/or otherwise disregards the communication.

In some examples, the example communication handler 308 implements example means for handling communications. The communication handling means is implemented by executable instructions such as that implemented by at least blocks 910 and 912 of FIG. 9. The executable instructions of blocks 910 and 912 of FIG. 9 may be executed on at least one processor such as the example processor 1112 of FIG. 11. In other examples, the communication handling means is implemented by hardware logic, hardware implemented state machines, logic circuitry, and/or any other combination of hardware, software, and/or firmware.

In the illustrated example of FIG. 3, the local datastore 310 is configured to record data (e.g., obtained information, commands, read and write privileges, etc.). For example, the local datastore 310 can store one or more files indicative of commands, participant device read and write privileges, participant device lists (e.g., the participant device list 118), cryptographic keys (e.g., the shared communication key, the shared system key, a private key associated with the first endpoint device 106, etc.), among others.

In the illustrated example of FIG. 3, the local datastore 310 may be implemented by a volatile memory (e.g., a SDRAM, DRAM, RAMBUS RDRAM, etc.) and/or a non-volatile memory (e.g., flash memory). The example local datastore 310 may additionally or alternatively be implemented by one or more DDR memories, such as DDR, DDR2, DDR3, DDR4, mDDR, etc. The example local datastore 310 may additionally or alternatively be implemented by one or more mass storage devices such as hard disk drive(s), compact disk drive(s), digital versatile disk drive(s), solid-state disk drive(s), etc. While in the illustrated example the local datastore 310 is illustrated as a single database, the local datastore 310 may be implemented by any number and/or type(s) of databases. Furthermore, the data stored in the example local datastore 310 may be in any data format such as, for example, binary data, comma delimited data, tab delimited data, SQL structures, etc.

As discussed above, for the sake of clarity, the structure and functionality of the example first endpoint device 106, the example second endpoint device 108, the example nth endpoint device 110, and the example SIEM 112 has been discussed with respect to the first endpoint device 106. However, the structure and functionality of the example first endpoint device 106, the example second endpoint device 108, the example nth endpoint device 110, and the example SIEM 112 is not limited thereto. For example, as described above, when the example communication processor 302, the example key generator 304, the example privilege controller 306, the example communication handler 308, the example local datastore 310, and/or the example communication bus 312 implement the SIEM 112, typically, communications to the SIEM 112 related to provisioning a group and/or adding a new member device to a group will not include a shared system key and will typically include a participant device list. As such, the example communication processor 302, the example key generator 304, the example privilege controller 306, the example communication handler 308, the example local datastore 310, and/or the example communication bus 312 may additionally or alternatively apply to any of the example first endpoint device 106, the example second endpoint device 108, the example nth endpoint device 110, and the example SIEM 112.

Figure 4:
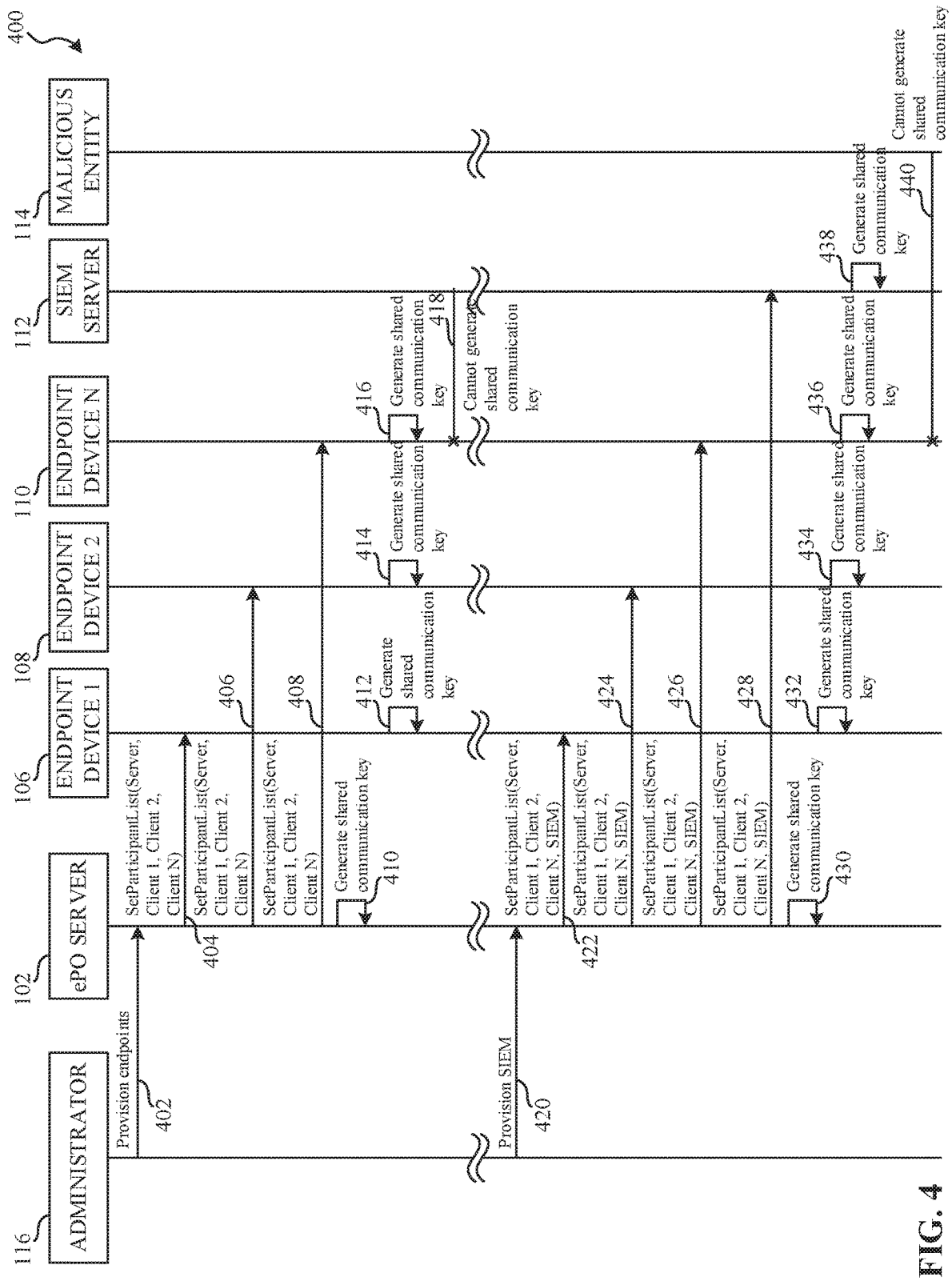
FIG. 4 is a sequence diagram showing an example communication flow between components of the example environment of FIG. 1 to improve network security.

FIG. 4 is a sequence diagram 400 showing an example communication flow between components of the example environment 100 of FIG. 1 to improve network security. The example sequence diagram 400 illustrates example communications between the example ePO 102, the example first endpoint device 106, the example second endpoint device 108, the example nth endpoint device 110, the example SIEM 112, the example malicious entity 114, and/or the example administrator 116 via the example network 104.

In the illustrated example of FIG. 4, the sequence diagram begins when the administrator 116 transmits a provision endpoint devices command 402 to the ePO 102 to provision a secured group in the network 104. In the example of FIG. 4, the provision endpoint devices command 402 indicates that the secured group should include the ePO 102, the first endpoint device 106, the second endpoint device 108, and the nth endpoint device 110. Additionally, in the example of FIG. 4, the provision endpoint devices command 402 indicates a policy for the read and write privileges of the participant devices in the secured group and to generate the shared communication key by generating with the other participant devices. Based on the provision endpoint devices command 402, the example ePO 102 generates a participant device list including the ePO 102, the first endpoint device 106, the second endpoint device 108, and the nth endpoint device 110.

In the illustrated example of FIG. 4, the ePO 102 sets the read and write privileges of the example ePO 102 such that the ePO 102 can read and/or write CnC communications from and/or to any of the first endpoint device 106, the second endpoint device 108, and the nth endpoint device 110. Additionally, the ePO 102 sets the read and write privileges of the first endpoint device 106, the second endpoint device 108, and the nth endpoint device 110 such that the first endpoint device 106, the second endpoint device 108, and the nth endpoint device 110 can read and/or write CnC communications from and/or to any of the ePO 102, the first endpoint device 106, the second endpoint device 108, and the nth endpoint device 110. In other words, any one of the endpoint devices can read communications and/or write communications to any of the other devices in the secured group. Thereafter, at operations 404, 406, and 408, the ePO 102 transmits the participant device list and the read and write privileges to the other participant devices in the secured group (e.g., the first endpoint device 106, the second endpoint device 108, and the nth endpoint device 110).

In the illustrated example of FIG. 4, in response to receiving a communication related to provisioning a secured group that includes a participant device list, the ePO 102, the first endpoint device 106, the second endpoint device 108, and the nth endpoint device 110 generate the shared communication key at operations 410, 412, 414, and 416. Thereafter, the example first endpoint device 106, the second endpoint device 108, and the nth endpoint device 110 store the shared communication key, the participant device privileges, and the participant device list. Subsequently, the example ePO 102, the example first endpoint device 106, the example second endpoint device 108, and the example nth endpoint device 110 encrypt and/or decrypt CnC communications with each other with the shared communication key.

In the illustrated example of FIG. 4, because the SIEM 112 and the malicious entity 114 do not have access to the shared communication key, neither the SIEM 112 nor the malicious entity 114 can read CnC communications over the network 104 (e.g., operation 418). Thus, the security of the example ePO 102, the example first endpoint device 106, the example second endpoint device 108, and the example nth endpoint device 110 is improved. However, as discussed above, it is possible that one or more of the participant devices in the secured group may become compromised. For example, if any one of the first endpoint device 106, the second endpoint device 108, or the nth endpoint device 110 is exposed to a virus or other malicious software (e.g., via a non-CnC channel communication and/or physical interaction (e.g., a user plugs in an infected flash-drive)), that endpoint device can be compromised (e.g., by the malicious entity 114). If a participant device becomes compromised, examples disclosed herein advantageously provide a security appliance (e.g., the SIEM 112 and/or any other security device) to monitor the network traffic of the group to identify the compromised participant device. As such, examples disclosed herein advantageously enable the addition of security appliances to secured groups.

In the illustrated example of FIG. 4, the administrator 116 transmits a provision SIEM command 420 to the ePO 102 to add a new member device (e.g., participant device) to the secured group. In the example of FIG. 4, the provision SIEM command 420 indicates that the new member device is the SIEM 112. However, in additional or alternative examples, the provision SIEM command 420 may indicate one or more additional or alternative member devices, such as additional endpoint devices, other security appliances, among others. Furthermore, the provision SIEM command 420 may indicate to remove one or more member devices from the group. Additionally, in the example of FIG. 4, the provision SIEM command 420 indicates a policy for the read and write privileges of the new participant devices in the secured group and to generate the new shared communication key with the other participant devices. Based on the provision SIEM command 420, the ePO 102 updates the participant device list to include the ePO 102, the first endpoint device 106, the second endpoint device 108, the nth endpoint device 110, and the SIEM 112.

In the illustrated example of FIG. 4, the ePO 102 updates (e.g., sets) the read and write privileges of the ePO 102, the first endpoint device 106, the second endpoint device 108, the nth endpoint device 110, and the SIEM 112 such that the SIEM 112 can read and/or write CnC communications from and/or to any of the ePO 102, the first endpoint device 106, the second endpoint device 108, and the nth endpoint device 110. Thereafter, at operations 422, 424, 426, and 428, the example ePO 102 transmits the updated participant device list and the updated read and write privileges to the other participant devices in the secured group (e.g., the first endpoint device 106, the second endpoint device 108, the nth endpoint device 110, and the SIEM 112).

In the illustrated example of FIG. 4, in response to receiving a communication related to adding a new member device to the secured group (e.g., for the first endpoint device 106, the second endpoint device 108, and the nth endpoint device 110) and/or a communication related to provisioning a secured group (e.g., for the SIEM 112) that includes a participant device list, the ePO 102, the first endpoint device 106, the second endpoint device 108, the nth endpoint device 110, and the SIEM 112 generate the shared communication key at operations 430, 432, 434, 436, and 438. Thereafter, the example first endpoint device 106, the example second endpoint device 108, the example nth endpoint device 110, and the example SIEM 112 store the shared communication key and the participant device privileges. Subsequently, the example ePO 102, the example first endpoint device 106, the example second endpoint device 108, the example nth endpoint device 110, and the example SIEM 112 encrypt and/or decrypt CnC communications with each other with the new shared communication key.

In the illustrated example of FIG. 4, because the malicious entity 114 does not have access to the shared communication key, the malicious entity 114 cannot read communications over the network 104 (e.g., operation 440). Thus, the security of the ePO 102, the first endpoint device 106, the second endpoint device 108, and the nth endpoint device 110 is improved. Additionally, even if any one of the first endpoint device 106, the second endpoint device 108, and the nth endpoint device 110 interacts with a virus or other malicious software, that endpoint device can be compromised (e.g., the malicious entity 114), the example SIEM 112 can detect the malicious activity and/or compromised device and remediate any data leakage and/or network exposure because the SIEM 112 has been added to the group as a sanctioned listener.

In the illustrated example of FIG. 4, adding and/or subtracting of sanctioned listeners is accomplished by joining them to the ratchet tree group where all participant devices in the group generate the shared communication key. In this manner, all participant devices know which devices are in the sanctioned group. Authorization of a new member device (e.g., security appliances, additional endpoints, etc.) is determined by the administrator 116 and facilitated by the ePO 102 (e.g., the management layer) out of band from the communication channel being observed (e.g., CnC communications) by the security appliance (e.g., the SIEM 112 and/or any other security device). Additionally, by generating the shared communication key (e.g., a shared symmetric session key) for all participant devices in a secured network via an asynchronous ratchet tree group key calculation, the security of the group is improved.

Figure 5:
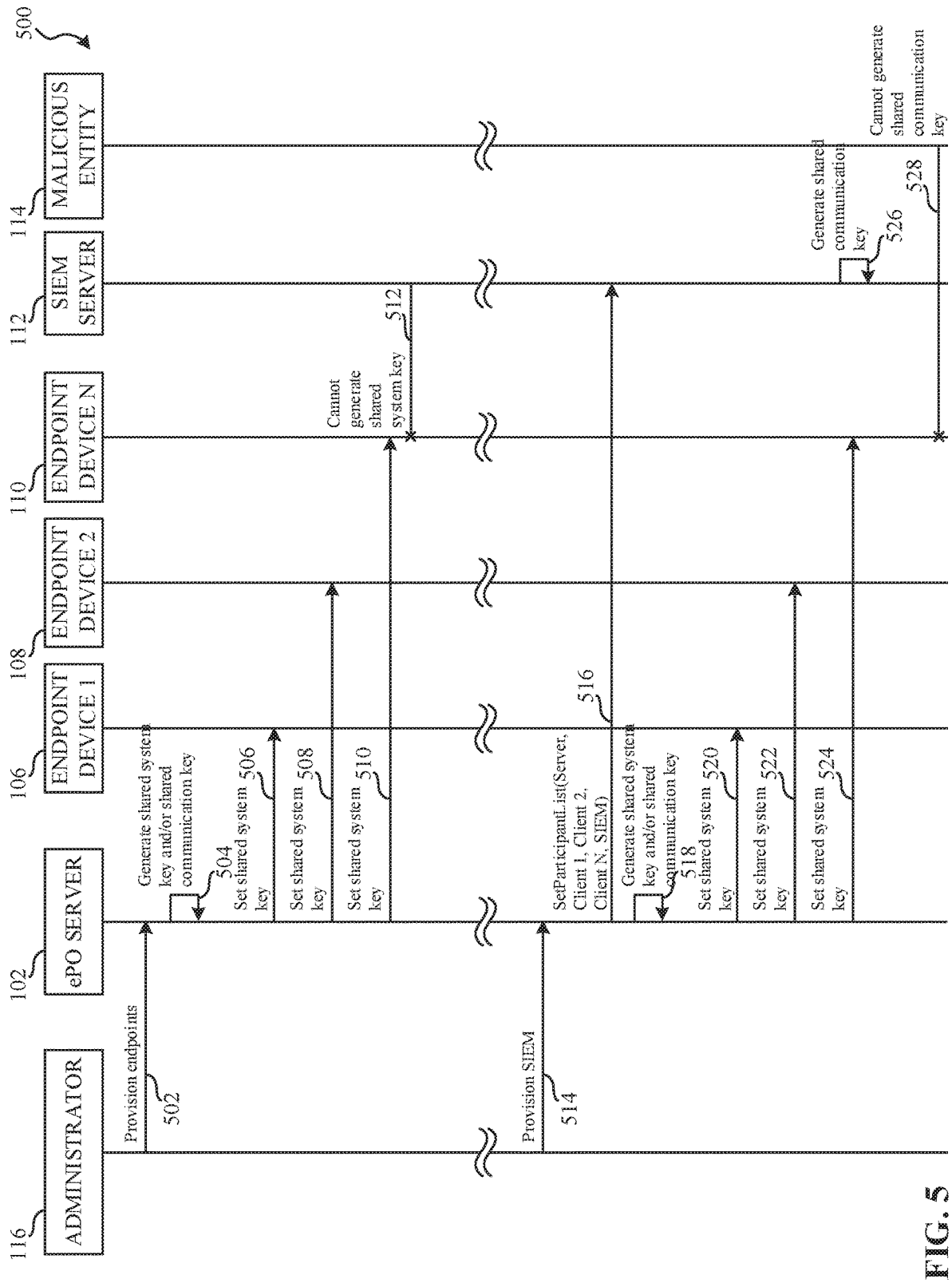
FIG. 5 is sequence diagram showing an example communication flow between components of the example environment of FIG. 1 to reduce computational burden and improve network security.

FIG. 5 is a sequence diagram 500 showing an example communication flow between components of the example environment 100 of FIG. 1 to reduce computational burden and improve network security. The example sequence diagram 500 illustrates example communications between the example ePO 102, the example first endpoint device 106, the example second endpoint device 108, the example nth endpoint device 110, the example SIEM 112, the example malicious entity 114, and/or the example administrator 116 via the example network 104.

In the illustrated example of FIG. 5, the sequence diagram begins when the administrator 116 transmits a provision endpoint devices command 502 to the ePO 102 to provision a secured group in the network 104. In the example of FIG. 5, the provision endpoint devices command 502 indicates that the secured group should include the ePO 102, the first endpoint device 106, the second endpoint device 108, and the nth endpoint device 110. Additionally, in the example of FIG. 5, the provision endpoint devices command 502 indicates a policy for the read and write privileges of the participant devices in the secured group and to generate the shared communication key exclusive of participant endpoint devices. Based on the provision endpoint devices command 502, the example ePO 102 generates a participant device list including the ePO 102, the first endpoint device 106, the second endpoint device 108, and the nth endpoint device 110.

In the illustrated example of FIG. 5, the ePO 102 sets the read and write privileges of the ePO 102 such that the ePO 102 can read and/or write CnC communications from and/or to any of the first endpoint device 106, the second endpoint device 108, and the nth endpoint device 110. Additionally, the example ePO 102 sets the read and write privileges of the first endpoint device 106, the second endpoint device 108, and the nth endpoint device 110 such that the first endpoint device 106, the second endpoint device 108, and the nth endpoint device 110 can read and/or write CnC communications from and/or to any of the ePO 102, the first endpoint device 106, the second endpoint device 108, and the nth endpoint device 110. At operation 504, the example ePO 102 generates the group key via an asynchronous ratchet tree group key calculation. Thereafter, at operations 506, 508, and 510, the example ePO 102 transmits a shared system key corresponding to the shared communication key and the read and write privileges to the other participant devices in the secured group (e.g., the first endpoint device 106, the second endpoint device 108, and the nth endpoint device 110). In response to the example endpoint devices 106, 108, 110 receiving the shared system key, the endpoint devices 106, 108, 110 generate the shared communication key based on the shared system key.

In the illustrated example of FIG. 5, in response to receiving a communication related to provisioning a secured group that includes a shared system key, the first endpoint device 106, the second endpoint device 108, and the nth endpoint device 110 generate the shared communication key based on the shared system key and store the shared communication key, the shared system key, and/or the participant device privileges. Subsequently, the example ePO 102, the example first endpoint device 106, the example second endpoint device 108, and the example nth endpoint device 110 encrypt and/or decrypt CnC communications with each other with the shared communication key.

In the illustrated example of FIG. 5, because the SIEM 112 and the malicious entity 114 do not have access to the shared communication key, neither the SIEM 112 nor the malicious entity 114 can read communications over the network 104 (e.g., operation 512). Thus, the security of the example ePO 102, the example first endpoint device 106, the example second endpoint device 108, and the example nth endpoint device 110 is improved. However, as discussed above, it is possible that one or more of the participant devices in the secured group may become compromised. For example, if any one of the first endpoint device 106, the second endpoint device 108, or the nth endpoint device 110 interacts with a virus or other malicious software, that endpoint device can be compromised (e.g., the malicious entity 114). If a participant device becomes compromised, examples disclosed herein advantageously provide a security appliance (e.g., the SIEM 112 and/or any other security device) to monitor the network traffic of the group to identify the compromised participant device. As such, examples disclosed herein advantageously enable the addition of security appliances to secured groups.

In the illustrated example of FIG. 5, the administrator 116 transmits a provision SIEM command 514 to the ePO 102 to add a new member device (e.g., participant device) to the secured group. In the example of FIG. 5, the provision SIEM command 514 indicates that the new member device is the SIEM 112. However, in additional or alternative examples, the provision SIEM command 514 may indicate one or more additional or alternative member devices, such as additional endpoint devices, other security appliances, among others. Furthermore, the provision SIEM command 514 may indicate to remove one or more member devices from the group. Additionally, in the example of FIG. 5, the provision SIEM command 514 indicates a policy for the read and write privileges of the new participant devices in the secured group and to generate the new shared communication key by generating the new shared communication key with the other participant devices. Based on the provision SIEM command 514, the ePO 102 updates the participant device list to include the ePO 102, the first endpoint device 106, the second endpoint device 108, the nth endpoint device 110, and the SIEM 112.

In the illustrated example of FIG. 5, the ePO 102 updates (e.g., sets) the read and write privileges of the ePO 102, the first endpoint device 106, the second endpoint device 108, the nth endpoint device 110, and the SIEM 112 such that the SIEM 112 can read and/or write CnC communications from and/or to any of the ePO 102, the first endpoint device 106, the second endpoint device 108, and the nth endpoint device 110. Because the new member device being added to the participant device list is a security appliance (e.g., the SIEM 112 and/or any other security device), the example ePO 102 transmits the updated participant device list and the update participant device privileges to the SIEM 112 at operation 516. At operation 518, the example ePO 102 generates the new shared communication key exclusive of participant endpoint devices. Thereafter, at operations 520, 522, and 528, the example ePO 102 transmits the updated participant device list, the updated read and write privileges, and the new shared communication key to the other non-security appliance participant devices in the secured group (e.g., the first endpoint device 106, the second endpoint device 108, and the nth endpoint device 110). In response to the example endpoint devices 106, 108, 110 receiving the shared system key, the endpoint devices 106, 108, 110 generate the shared communication key based on the shared system key.

In the illustrated example of FIG. 5, in response to receiving a communication related to adding a new member device to the secured group (e.g., for the first endpoint device 106, the second endpoint device 108, and the nth endpoint device 110), the example first endpoint device 106, the example second endpoint device 108, the example nth endpoint device 110, store the new shared communication key. In response to receiving a communication related to provisioning a secured group (e.g., for the SIEM 112) that includes a participant device list, the example SIEM 112 generates the new shared communication key at operation 526. Thereafter, the example first endpoint device 106, the example second endpoint device 108, and the example nth endpoint device 110 store the new shared communication key and the updated participant device privileges and the example SIEM 112 stores the new shared communication key, the updated participant device privileges, and the updated participant device list. Subsequently, the example ePO 102, the example first endpoint device 106, the example second endpoint device 108, the example nth endpoint device 110, and the example SIEM 112 encrypt and/or decrypt CnC communications with each other with the new shared communication key.

In the illustrated example of FIG. 5, because the malicious entity 114 does not have access to the shared communication key, the malicious entity 114 cannot read communications over the network 104 (e.g., operation 528). Thus, the security of the example ePO 102, the example first endpoint device 106, the example second endpoint device 108, and the example nth endpoint device 110 is improved. Additionally, even if the user of any one of the first endpoint device 106, the second endpoint device 108, or the nth endpoint device 110 is exposed to a virus or other malicious software, from an endpoint device that is compromised (e.g., the malicious entity 114), the example SIEM 112 can detect the malicious activity and/or compromised device and remediate any security threats, data leakage, and/or network exposure because the SIEM 112 has been added to the group as a sanctioned listener.

In the illustrated example of FIG. 5, the ePO 102 eliminates the computational burden expended by endpoint devices to generate shared communication keys. Thus, endpoint devices can be part of secured groups by using a key supplied to the endpoint devices by the ePO 102 (e.g., the control plane server). As such, the example illustrated in FIG. 5 reduces the size (e.g., computational burden) of the ratchet tree calculation.

Figure 6:
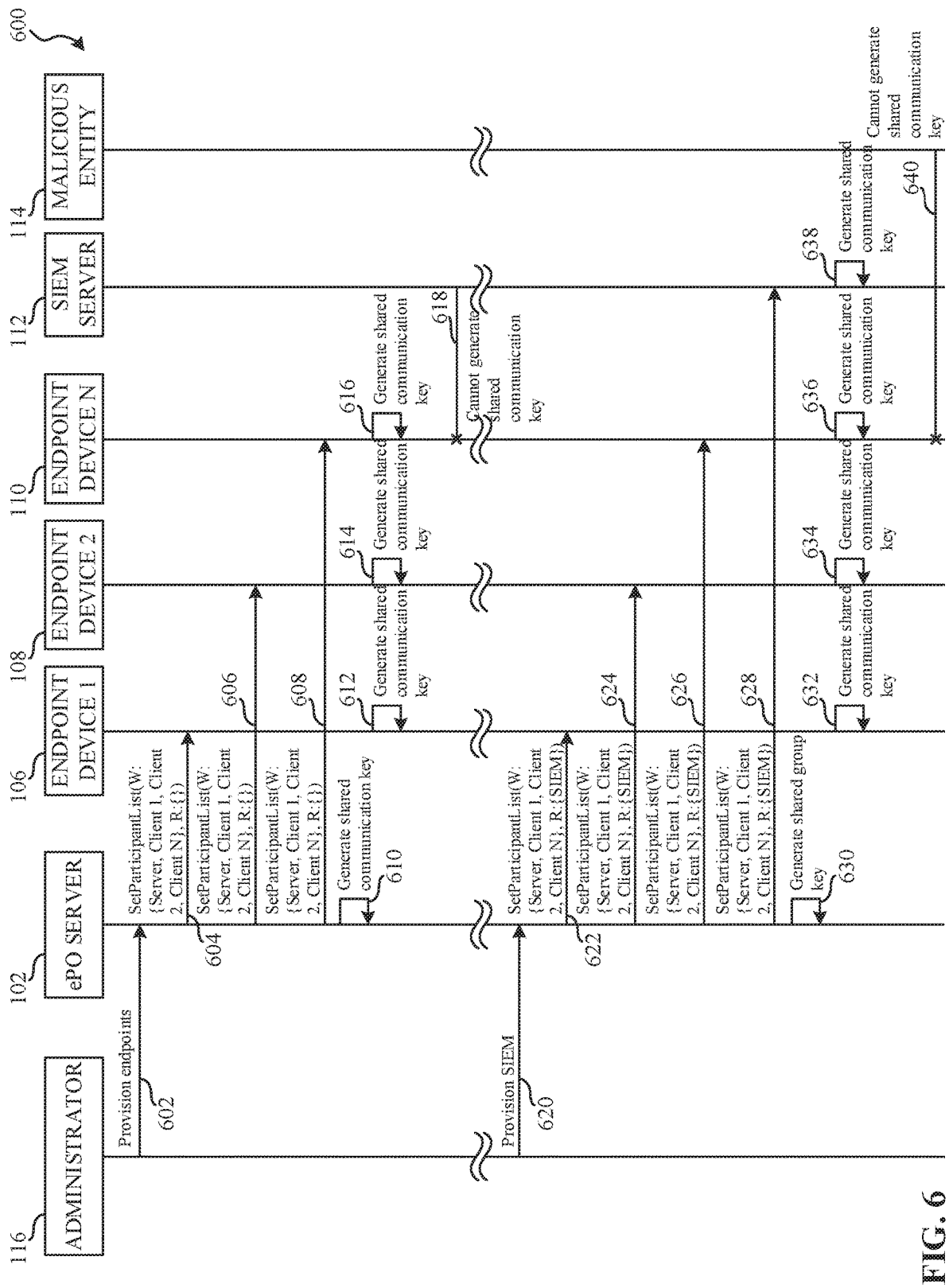
FIG. 6 is sequence diagram showing an alternative example communication flow between components of the example environment of FIG. 1 to improve network security.

FIG. 6 is sequence diagram 600 showing an alternative example communication flow between components of the example environment 100 of FIG. 1 to improve network security. The example sequence diagram 600 illustrates example communications between the example ePO 102, the example first endpoint device 106, the example second endpoint device 108, the example nth endpoint device 110, the example SIEM 112, the example malicious entity 114, and/or the example administrator 116 via the example network 104.

In the illustrated example of FIG. 6, the sequence diagram begins when the administrator 116 transmits a provision endpoint devices command 602 to the ePO 102 to provision a secured group in the network 104. In the example of FIG. 6, the provision endpoint devices command 602 indicates that the secured group should include the ePO 102, the first endpoint device 106, the second endpoint device 108, and the nth endpoint device 110. Additionally, in the example of FIG. 6, the provision endpoint devices command 602 indicates a policy for the read and write privileges of the participant devices in the secured group and to generate the shared communication key by generating the new shared communication key with the other participant devices. Based on the provision endpoint devices command 602, the ePO 102 generates a participant device list including the example ePO 102, the first endpoint device 106, the second endpoint device 108, and the nth endpoint device 110.

In the illustrated example of FIG. 6, the ePO 102 sets the read and write privileges of the ePO 102 such that the ePO 102 can read and/or write CnC communications from and/or to any of the first endpoint device 106, the second endpoint device 108, and the nth endpoint device 110. In other words, the ePO 102 sets the read and write privileges of the ePO 102 such that the control plane server can read communications from and/or write communications to any of the first endpoint device 106, the second endpoint device 108, or the nth endpoint device 110. Additionally, the example ePO 102 sets the read and write privileges of the first endpoint device 106, the second endpoint device 108, and the nth endpoint device 110 such that the first endpoint device 106, the second endpoint device 108, and the nth endpoint device 110 can only read CnC communication from the ePO 102. Thereafter, at operations 604, 606, and 608, the example ePO 102 transmits the participant device list and the read and write privileges to the other participant devices in the secured group (e.g., the first endpoint device 106, the second endpoint device 108, and the nth endpoint device 110).

In the illustrated example of FIG. 6, in response to receiving a communication related to provisioning a secured group that includes a participant device list, the ePO 102, the first endpoint device 106, the second endpoint device 108, and the nth endpoint device 110 generate the shared communication key at operations 610, 612, 614, and 616. Thereafter, the example first endpoint device 106, the example second endpoint device 108, and the example nth endpoint device 110 store the shared communication key, the participant device privileges, and the participant device list. Subsequently, the example ePO 102, the example first endpoint device 106, the example second endpoint device 108, and the example nth endpoint device 110 encrypt and/or decrypt CnC communications with each other with the shared communication key.

In the illustrated example of FIG. 6, because the SIEM 112 and the malicious entity 114 are not listed as participant devices in the participant device list of the secured group, the ePO 102, the first endpoint device 106, the second endpoint device 108, and the nth endpoint device 110 ignore communications from the SIEM 112 and/or the malicious entity 114. Additionally, because the example SIEM 112 and the example malicious entity 114 do not have access to the shared communication key, neither the SIEM 112 nor the malicious entity 114 can read communications over the network 104 (e.g., operation 618). Thus, the security of the ePO 102, the first endpoint device 106, the second endpoint device 108, and the nth endpoint device 110 is improved. However, as discussed above, it is possible that one or more of the participant devices in the secured group may become compromised. For example, if any one of the first endpoint device 106, the second endpoint device 108, or the nth endpoint device 110 is exposed to a virus or other malicious software, that endpoint device can be compromised (e.g., the malicious entity 114). If a participant device becomes compromised, examples disclosed herein advantageously provide a security appliance (e.g., the SIEM 112 and/or any other security device) to monitor the network traffic of the group to identify the compromised participant device. As such, examples disclosed herein advantageously enable the addition of security appliances to secured groups.

In the illustrated example of FIG. 6, the administrator 116 transmits a provision SIEM command 620 to the ePO 102 to add a new member device (e.g., participant device) to the secured group. In the example of FIG. 6, the provision SIEM command 620 indicates that the new member device is the SIEM 112. However, in additional or alternative examples, the provision SIEM command 620 may indicate one or more additional or alternative member devices, such as additional endpoint devices, other security appliances, among others. Furthermore, the provision SIEM command 620 may indicate to remove one or more member devices from the group. Additionally, in the example of FIG. 6, the provision SIEM command 620 indicates a policy for the read and write privileges of the new participant devices in the secured group and to generate the new shared communication key with the other participant devices. Based on the provision SIEM command 620, the example ePO 102 updates the participant device list to include the ePO 102, the first endpoint device 106, the second endpoint device 108, the nth endpoint device 110, and the SIEM 112.

In the illustrated example of FIG. 6, the ePO 102 updates (e.g., sets) the read and write privileges of the ePO 102, the first endpoint device 106, the second endpoint device 108, the nth endpoint device 110, and the SIEM 112 such that the SIEM 112 can read CnC communications between any of the ePO 102, the first endpoint device 106, the second endpoint device 108, and the nth endpoint device 110. Additionally, the example ePO 102 updates (e.g., sets) the read and write privileges of the ePO 102, the first endpoint device 106, the second endpoint device 108, the nth endpoint device 110, and the SIEM 112 such that the SIEM 112 cannot write CnC communications to any of the first endpoint device 106, the second endpoint device 108, and the nth endpoint device 110. Thereafter, at operations 622, 624, 626, and 628, the example ePO 102 transmits the updated participant device list and the updated read and write privileges to the other participant devices in the secured group (e.g., the first endpoint device 106, the second endpoint device 108, the nth endpoint device 110, and the SIEM 112).

In the illustrated example of FIG. 6, the ePO 102 sets the read and write privileges of the participants devices in the secured group such that, a first participant device (e.g., the SIEM 112) and second ones of the participant devices (e.g., the endpoint devices) in the secured group of devices can read communications from any of the participant devices in the secured group, and (2) a second participant device can write communications to any of third ones of the participant devices, the third ones of participant devices not including the first participant device. As such, the security device can read communications between endpoint devices to facilitate sanctioned man-in-the-middle monitoring.

In the illustrated example of FIG. 6, in response to receiving a communication related to adding a new member device to the secured group (e.g., for the first endpoint device 106, the second endpoint device 108, and the nth endpoint device 110) and/or a communication related to provisioning a secured group (e.g., for the SIEM 112) that includes a participant device list, the example ePO 102, the example first endpoint device 106, the example second endpoint device 108, the example nth endpoint device 110, and the example SIEM 112 generate the new shared communication key at operations 630, 632, 634, 636, and 638. Thereafter, the example first endpoint device 106, the example second endpoint device 108, the example nth endpoint device 110, and the example SIEM 112 store the new shared communication key, the participant device privileges, and the participant device list. Subsequently, the example ePO 102, the example first endpoint device 106, the example second endpoint device 108, the example nth endpoint device 110, and the example SIEM 112 encrypt and/or decrypt CnC communications with each other with the new shared communication key.

In the illustrated example of FIG. 6, because the malicious entity 114 is not listed as a participant device in the participant device list of the secured group, the ePO 102, the first endpoint device 106, the second endpoint device 108, and the nth endpoint device 110 ignore communications from the malicious entity 114. Additionally, because the malicious entity 114 does not have access to the shared communication key, the example malicious entity 114 cannot read communications over the network 104 (e.g., operation 640). Thus, the security of the example ePO 102, the example first endpoint device 106, the example second endpoint device 108, and the example nth endpoint device 110 is improved. Additionally, even if any one of the first endpoint device 106, the second endpoint device 108, or the nth endpoint device 110 is exposed to a virus or other malicious software from an endpoint device (e.g., the malicious entity 114) that is compromised, the example SIEM 112 can detect the malicious activity and/or compromised device and remediate any data leakage and/or network exposure because the SIEM 112 has been added to the group as a sanctioned listener.

In the illustrated example of FIG. 6, by including the shared policy and group-based encryption keys (e.g., the shared communication key), the ePO 102 established subgroups of participant devices as readers and writers. In the example of FIG. 6, the policy returned by the ePO 102 includes a list of readers and writers. This list (e.g., the participant device privileges) is maintained and updated with every change to the secured group (e.g., rachet group). In this manner, the ePO 102 can add participant devices that have limited permissions (e.g. read-only). This capability is advantageous in computer security and/or network security for visibility and/or other controls of security managers, such as the SIEM 112. For example, because the SIEM 112 can detect nefarious activity by monitoring network communications, it is preferred that the SIEM 112 is able to monitor participant devices but not able to inject data or messages into messages exchanged. To enforce this policy, the other participant devices in the group ignore messages sourced from a reader.

While an example manner of implementing the ePO 102 of FIG. 1 is illustrated in FIG. 2 and an example manner of implementing the first endpoint device 106 (and/or the second endpoint device 108, the nth endpoint device 110, and/or the SIEM 112) of FIG. 1 is illustrated in FIG. 3, one or more of the elements, processes and/or devices illustrated in FIG. 2 and/or FIG. 3 may be combined, divided, re-arranged, omitted, eliminated and/or implemented in any other way. Further, the example communication processor 202, the example command controller 204, the example participant list generator 206, the example privilege controller 208, the example key generator 210, the example local datastore 212, and/or, more generally, the example ePO 102 of FIG. 2 and/or the example communication processor 302, the example key generator 304, the example privilege controller 306, the example communication handler 308, the example local datastore 310, and/or, more generally, the example first endpoint device 106 (and/or the example second endpoint device 108, the example nth endpoint device 110, and/or the example SIEM 112) of FIG. 3 may be implemented by hardware, software, firmware and/or any combination of hardware, software and/or firmware. Thus, for example, any of the example communication processor 202, the example command controller 204, the example participant list generator 206, the example privilege controller 208, the example key generator 210, the example local datastore 212, and/or, more generally, the example ePO 102 of FIG. 2 and/or the example communication processor 302, the example key generator 304, the example privilege controller 306, the example communication handler 308, the example local datastore 310, and/or, more generally, the example first endpoint device 106 (and/or the example second endpoint device 108, the example nth endpoint device 110, and/or the example SIEM 112) of FIG. 3 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication processor 202, the example command controller 204, the example participant list generator 206, the example privilege controller 208, the example key generator 210, the example local datastore 212, and/or, more generally, the example ePO 102 of FIG. 2 and/or the example communication processor 302, the example key generator 304, the example privilege controller 306, the example communication handler 308, the example local datastore 310, and/or, more generally, the example first endpoint device 106 (and/or the example second endpoint device 108, the example nth endpoint device 110, and/or the example SIEM 112) of FIG. 3 is/are hereby expressly defined to include a non-transitory computer readable storage device or storage disk such as a memory, a digital versatile disk (DVD), a compact disk (CD), a Blu-ray disk, etc. including the software and/or firmware. Further still, the example the example ePO 102 may include one or more elements, processes and/or devices in addition to, or instead of, those illustrated in FIG. 2, and/or may include more than one of any or all of the illustrated elements, processes and devices. Additionally, the example first endpoint device 106 (and/or the example second endpoint device 108, the example nth endpoint device 110, and/or the example SIEM 112) may include one or more elements, processes and/or devices in addition to, or instead of, those illustrated in FIG. 3. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 7:
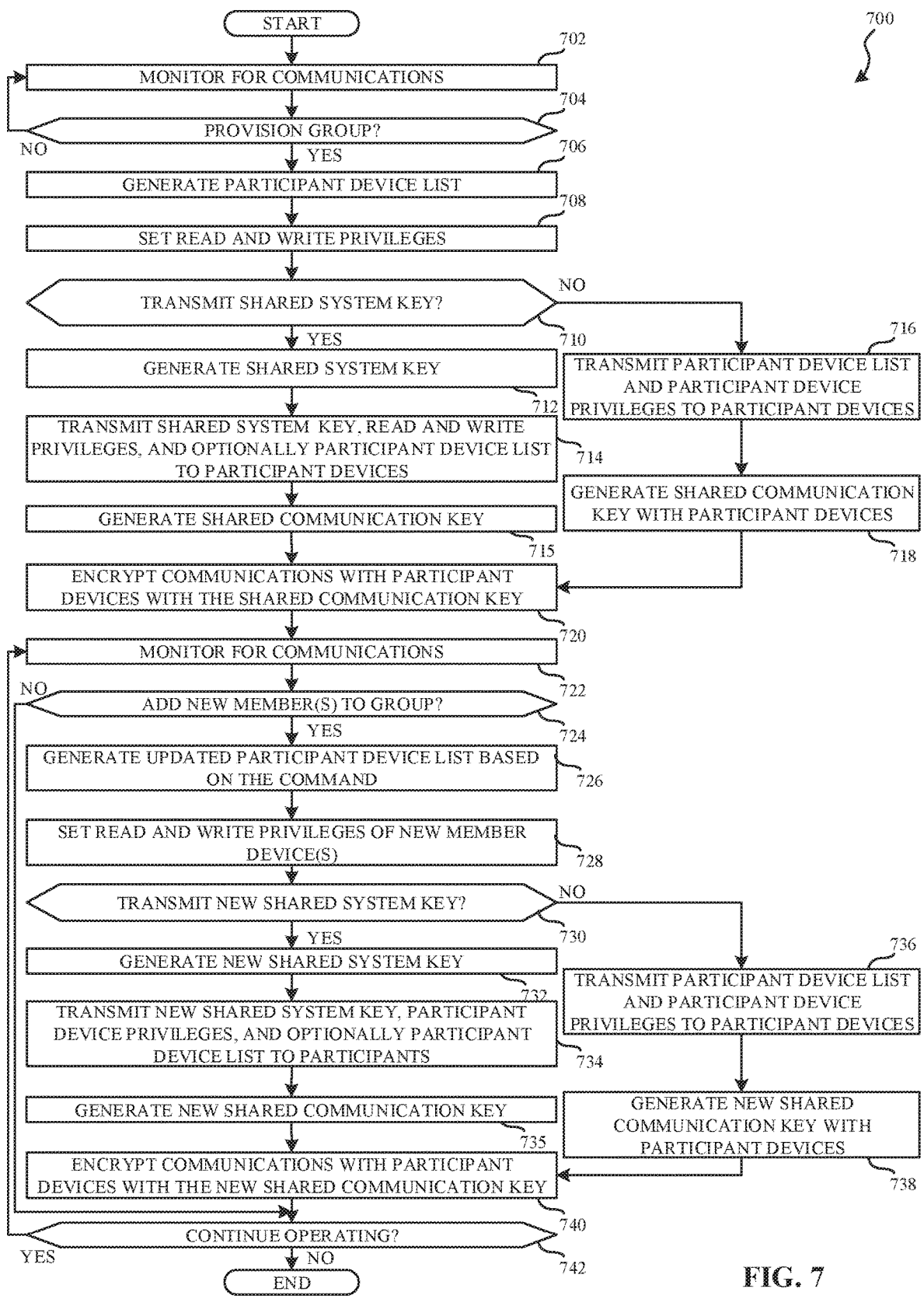
FIG. 7 is a flowchart representative of example machine-readable instructions that may be executed to implement the ePolicy Orchestrator of FIGS. 1 and/or 2 to provision and/or alter a secured group.

A flowchart representative of example hardware logic, machine readable instructions, hardware implemented state machines, and/or any combination thereof for implementing the ePO 102 of FIGS. 1 and/or 2 is shown in FIG. 7. The machine readable instructions may be one or more executable programs or portion(s) of an executable program for execution by a computer processor and/or processor circuitry, such as the processor 1012 shown in the example processor platform 1000 discussed below in connection with FIG. 10. The program may be embodied in software stored on a non-transitory computer readable storage medium such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIG. 7, many other methods of implementing the example ePO 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

Figure 8:
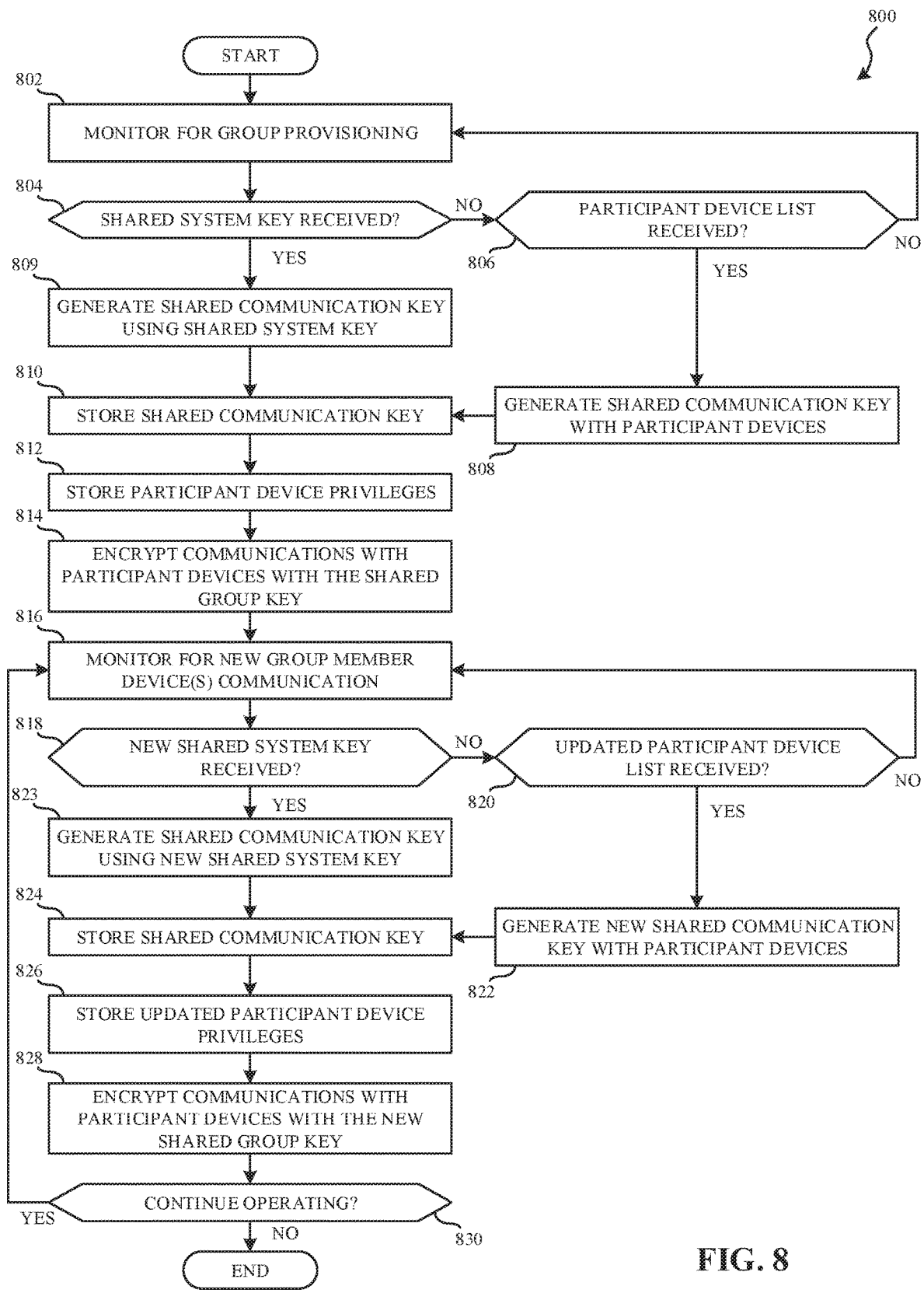
FIG. 8 is a flowchart representative of example machine-readable instructions that may be executed to implement the first endpoint device of FIGS. 1 and/or 3 to participate in a secured group.
Figure 9:
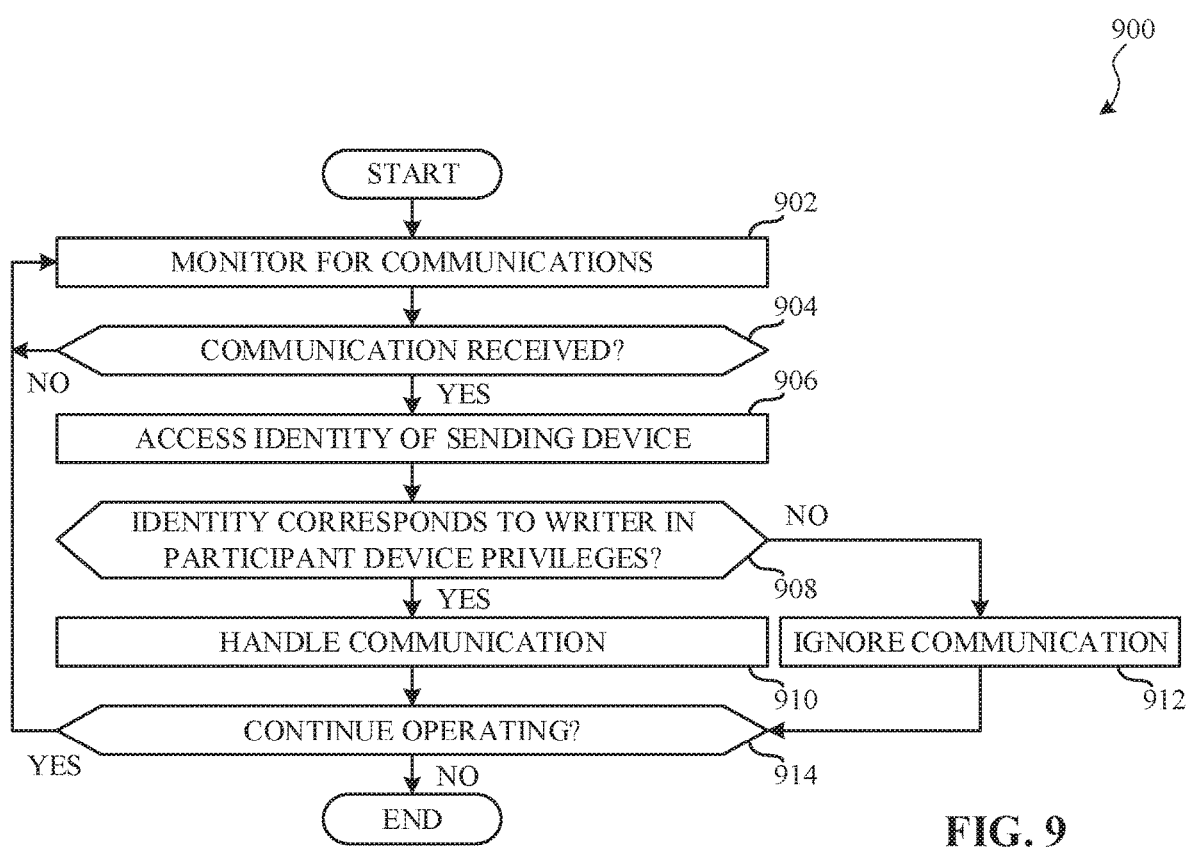
FIG. 9 is a flowchart representative of example machine-readable instructions that may be executed to implement the first endpoint device of FIGS. 1 and/or 3 to process communications in a secured group.

Flowcharts representative of example hardware logic, machine readable instructions, hardware implemented state machines, and/or any combination thereof for implementing the example first endpoint device 106 (and/or the example second endpoint device 108, the example nth endpoint device 110, and/or the example SIEM 112) of FIGS. 1 and/or 3 are shown in FIGS. 8 and 9. The machine readable instructions may be one or more executable programs or portion(s) of an executable program for execution by a computer processor and/or processor circuitry, such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowcharts illustrated in FIGS. 8 and 9, many other methods of implementing the example the example first endpoint device 106 (and/or the example second endpoint device 108, the example nth endpoint device 110, and/or the example SIEM 112) may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine-readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 7, 8 and/or 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 7 is a flowchart representative of example machine-readable instructions 700 that may be executed to implement the ePolicy orchestrator (ePO) 102 of FIGS. 1 and/or 2 to provision and/or alter a secured group. The example machine-readable instructions 700 begin at block 702 where the command controller 204 monitors the network 104 for communications. At block 704, in response to the example ePO 102 receiving a communication, the example command controller 204 determines whether the communication includes a command to provision a group (e.g., a provisioning command such as the provision endpoint devices command 402 of FIG. 4, the provision endpoint devices command 502 of FIG. 5, and/or the provision endpoint devices command 602 of FIG. 6). In response to the example command controller 204 determining that a communication to the ePO 102 includes a command to provision a group (block 704: YES), the machine-readable instructions 700 proceed to block 706. In response to the example command controller 204 determining that a communication to the ePO 102 does not include a command to provision a group (block 704: NO), the machine-readable instructions 700 return to block 702.

In the illustrated example of FIG. 7, in response to the command controller 204 determining that the ePO 102 has received a command to provision a secured group (block 704: YES), the participant list generator 206 generates a participant device list based on the command, at block 706. At block 708, the example privilege controller 208 sets the read and write privileges for the participant devices in the group based on the command. At block 710, the example command controller 204 determines whether to transmit a shared system key corresponding to a shared communication key (e.g., whether the command to provision a group indicates to generate a shared communication key exclusive of participant endpoint devices or to generate the shared communication key with the other participant devices in the secured group).

In the illustrated example of FIG. 7, in response to the command controller 204 determining that the shared system key is to be transmitted (block 710: YES), the key generator 210 generates a shared system key that can be used to generate the shared communication key, the shared system key and/or the shared communication key being exclusive of participant endpoint devices at block 712. At block 714, after the key generator 210 generates the shared system key, the example command controller 204 transmits, via the communication processor 202, the shared system key (e.g., determined by the key generator 210) and the participant device read and write privileges (e.g., set by the privilege controller 208 based on a policy indicated in the command) to the other participant devices in the secured group. Optionally, at block 714, if a security appliance (e.g., the SIEM 112 and/or any other security device) is included on the participant device list, the example command controller 204 also transmits the participant device list and read and write privileges to the security appliance over a channel that is out of band from the CnC channel. At block 715, the example key generator 210 generates a shared communication key based on the shared system key (e.g., so that an end device can generate the shared communication key and then read or write data over the channel after receiving the shared system key and participant list). After block 715, the machine-readable instructions 700 proceed to block 720.

In the illustrated example of FIG. 7, in response to the command controller 204 determining that the shared system key is to be transmitted (block 710: NO), the command controller 204 transmits, via the communication processor 202, the participant devices list (e.g., generated by the participant list generator 206) and the participant devices read and write privileges (e.g., set by the privilege controller 208 based on a policy indicated in the command) to the other participant devices in the secured group at block 716. In other words, when the command indicates to generate the shared communication key with the other participant devices in the secured group, the example command controller 204 transmits, via the communication processor 202, the participant devices list and the participant devices read and write privileges to the other participant devices in the secured group. At block 718, the example key generator 210 generates the shared communication key with the other participant devices via an asynchronous ratchet tree group key calculation. After block 718, the machine-readable instructions 700 proceed to block 720.

In the illustrated example of FIG. 7, at block 720, the example communication processor 202 encrypts communications to other participant devices in the group and/or decrypts communications from other participant devices in the group using the shared communication key. At block 722, the example command controller 204 monitors the network 104 for communications. In response to the ePO 102 receiving a communication, the command controller 204 determines whether the communication includes a command to add one or more new member devices to the secured group at block 724 (e.g., the provision SIEM command 420 of FIG. 4, the provision SIEM command 514 of FIG. 5, and/or the provision SIEM command 620 of FIG. 6). Alternatively, the communication can include a command to remove one or more member devices from the secured group. In response to the example command controller 204 determining that the communication includes a command to add one or more new member devices to the group and/or remove one or more member devices (block 724: YES), the machine-readable instructions 700 proceed to block 726. In response to the example command controller 204 determining that the communication does not include a command to add one or more new member devices to the group and/or remove one or more member devices (block 724: NO), the machine-readable instructions 700 return to block 742.

In the illustrated example of FIG. 7, in response to the command controller 204 determining that the ePO 102 has received a command to add one or more new member devices to the group and/or remove one or more member devices (block 724: YES), the participant list generator 206 generates an updated participant device list based on the command, at block 726. At block 728, the privilege controller 208 updates (e.g., sets) the read and write privileges for the participant devices in the group based on the command, including the one or more new member devices. At block 730, the example command controller 204 determines whether a new shared system key is to be transmitted (e.g., whether the command to add one or more new member devices to the group and/or remove one or more member devices indicates to generate a new shared communication key exclusive of participant endpoint devices in the secured group.

In the illustrated example of FIG. 7, in response to the command controller 204 determining that the shared system key is to be transmitted (block 730: YES), the key generator 210 generates the new shared system key that can be used to generate the shared communication key, the shared system key and/or the shared communication key being exclusive of participant endpoint devices, at block 732. At block 734, the example command controller 204 transmits, via the communication processor 202, the new shared system key (e.g., determined by the key generator 210) and the updated participant device read and write privileges (e.g., set by the privilege controller 208 based on a policy indicated in the command) to the other participant devices in the secured group. Optionally, at block 734, if a security appliance (e.g., the SIEM 112 and/or any other security device) is included on the participant device list, the example command controller 204 also transmits the participant device list and read and write privileges to the security appliance over a channel that is out of band from the CnC channel. At block 735, the example key generator 210 generates a new shared communication key based on the new shared system key. After block 735, the machine-readable instructions 700 proceed to block 740.

In the illustrated example of FIG. 7, in response to the command controller 204 determining that the shared system key is to be transmitted (block 730: NO), the command controller 204 transmits, via the communication processor 202, the updated participant devices list (e.g., generated by the participant list generator 206) and the updated participant devices read and write privileges (e.g., set by the privilege controller 208 based on a policy indicated in the command) to the other participant devices in the secured group at block 736. In other words, when the command indicates to generate the new shared communication key with the other participant devices in the secured group, the example command controller 204 transmits, via the communication processor 202, the updated participant devices list and the updated participant devices read and write privileges to the other participant devices in the secured group. At block 738, the example key generator 210 generates the new shared communication key with the other participant devices via an asynchronous ratchet tree group key calculation. After block 738, the machine-readable instructions 700 proceed to block 740.

In the illustrated example of FIG. 7, at block 740, the communication processor 202 encrypts communications to other participant devices in the group and/or decrypts communications from other participant devices in the group using the shared communication key. At block 742, the example command controller 204 determines whether to continue operating. For example, conditions that may cause the command controller 204 to determine not to continue operating include a command to cease operations, a loss of power, among others. In response to the example command controller 204 determining to continue operating (block 742: YES), the machine-readable instructions 700 return to block 722. In response to the example command controller 204 determining not to continue operating (block 742: NO), the machine-readable instructions 700 terminate.

FIG. 8 is a flowchart representative of example machine-readable instructions 800 that may be executed to implement the first endpoint device 106 of FIGS. 1 and/or 3 to participate in a secured group. The machine-readable instructions 800 begin at block 802 where the example communication processor 302 monitors the network 104 for communications related to group provisioning. In response to detecting a communication, the example communication processor 302 determines whether the communication includes a shared system key corresponding to a shared communication key, at block 804. In response to the example communication processor 302 determining that the communication does not include a shared system key (block 804: NO), the machine-readable instructions 800 proceed to block 806 where the example communication processor 302 determines whether the communication includes a participant device list. In response to the example communication processor 302 determining that the communication includes a shared system key (block 804: YES), the machine-readable instructions 800 generates the shared communication key using the shared system key (block 809). When the machine-readable instructions 800 implement the SIEM 112, block 804 may be omitted because such communications to the SIEM 112 will not include a shared system key and will typically include a participant device list.

In the illustrated example of FIG. 8, in response to the example communication processor 302 determining that the communication does not include a participant device list (block 806: NO), the machine-readable instructions 800 return to block 802. In response to the example communication processor 302 determining that the communication includes a participant device list (block 806: YES), the machine-readable instructions 800 proceed to block 808 where the example key generator 304 generates the shared communication key with the other participant devices via an asynchronous ratchet tree group key calculation. After block 808, the machine-readable instructions 800 proceed to block 810.

In the illustrated example of FIG. 8, at block 810, the key generator 304 stores the shared communication key. For example, after reception of a communication indicating that a secured group of devices in a network is to be provisioned to prevent malicious activity, the example key generator 304 stores the shared communication key. At block 812, the example privilege controller 306 stores the participant device privileges. Optionally, at block 812, if the communication included a participant device list (e.g., block 806: YES), the privilege controller 306 also stores the participant device list. At block 814, the example communication processor 302 encrypts communications to other participant devices in the group and/or decrypts communications from other participant devices in the group using the shared communication key. At block 816, the example communication processor 302 monitors the network 104 for communications related to adding new member devices to and/or remove member devices from a secured group. In response to detecting a communication, the example communication processor 302 determines whether the communication includes a new shared system key, at block 818.

In the illustrated example of FIG. 8, in response to the communication processor 302 determining that the communication does not include a new shared system key (block 818: NO), the machine-readable instructions 800 proceed to block 820 where the communication processor 302 determines whether the communication includes an updated participant device list. In response to the example communication processor 302 determining that the communication includes a new shared system key (block 818: YES), the machine-readable instructions 800 generates the shared communication key using the new shared system key (block 823). When the machine-readable instructions 800 implement the SIEM 112, block 818 may be omitted because such communications to the SIEM 112 will not include a shared system key and will typically include a participant device list.

In the illustrated example of FIG. 8, in response to the communication processor 302 determining that the communication does not include an updated participant device list (block 820: NO), the machine-readable instructions 800 return to block 816. In response to the example communication processor 302 determining that the communication includes an updated participant device list (block 820: YES), the machine-readable instructions 800 proceed to block 822 where the example key generator 304 generates the new shared communication key with the other participant devices via an asynchronous ratchet tree group key calculation. After block 822, the machine-readable instructions 800 proceed to block 824.

In the illustrated example of FIG. 8, at block 824, the key generator 304 stores the new shared communication key. At block 826, the privilege controller 306 stores the updated participant device privileges. Optionally, at block 826, if the communication included a participant device list (e.g., block 820: YES), the example privilege controller 306 also stores the participant device list. At block 828, the example communication processor 302 encrypts communications to other participant devices in the group and/or decrypts communications from other participant devices in the group using the new shared communication key. At block 830, the example communication processor 302 determines whether to continue operating. For example, conditions that may cause the communication processor 302 to determine not to continue operating can include a loss of power, a communication to disband the secured group, among others. In response to the example communication processor 302 determining to continue operating (block 830: YES), the machine-readable instructions 800 return to block 816. In response to the example communication processor 302 determining not to continue operating (block 830: NO), the machine-readable instructions 800 terminate.

FIG. 9 is a flowchart representative of example machine-readable instructions 900 that may be executed to implement the first endpoint device 106 of FIGS. 1 and/or 3 to process communications in a secured group. The machine-readable instructions 900 begin at block 902 where the example communication processor 302 monitors for any other communications (e.g., communications not related to provisioning a group and/or adding new member devices to a group, CnC communications, etc.). At block 904, the example communication processor 302 determines whether the first endpoint device 106 has received a communication. In response to detecting a communication (e.g., a CnC communication) (block 904: YES), the example communication processor 302 accesses the identity of the sending device, at block 906. In response to the example communication processor 302 determining that the first endpoint device 106 has not received a communication (block 904: NO), the machine-readable instructions 900 return to block 902.

In the illustrated example of FIG. 9, at block 908, the communication processor 302 determines whether the identity of the sending device corresponds to a writer in the participant device privileges. In response to the example communication processor 302 determining that the identity of the sending device corresponds to a writer in the participant device privileges (block 908: YES), the example communication handler 308 handles and/or otherwise processes the communication, at block 910. For example, if the communication includes data packets related to a workload, the communication handler 308 processes the workload.

In the illustrated example of FIG. 9, in response to the communication processor 302 determining that the identity of the sending device does not correspond to a writer in the participant device privileges (e.g., block 908: NO), the communication handler 308 ignores and/or otherwise disregards the communication, at block 912. At block 914, the example communication processor 302 determines whether to continue operating. For example, conditions that may cause the communication processor 302 to determine not to continue operating can include a loss of power, a communication to disband the secured group, among others. In response to the example communication processor 302 determining to continue operating (block 914: YES), the machine-readable instructions 900 return to block 902. In response to the example communication processor 302 determining not to continue operating (block 914: NO), the machine-readable instructions 900 terminate.

As discussed above, for the sake of clarity, the structure and functionality of the example first endpoint device 106, the example second endpoint device 108, the example nth endpoint device 110, and the SIEM 112 have been discussed with respect to the first endpoint device 106. However, the structure and functionality of the example first endpoint device 106, the example second endpoint device 108, the example nth endpoint device 110, and the example SIEM 112 is not limited thereto. As such, the description of FIGS. 8 and/or 9 and/or any references to FIGS. 8 and/or 9 can additionally or alternatively apply to any of the example first endpoint device 106, the example second endpoint device 108, the example nth endpoint device 110, and the example SIEM 112.

Figure 10:
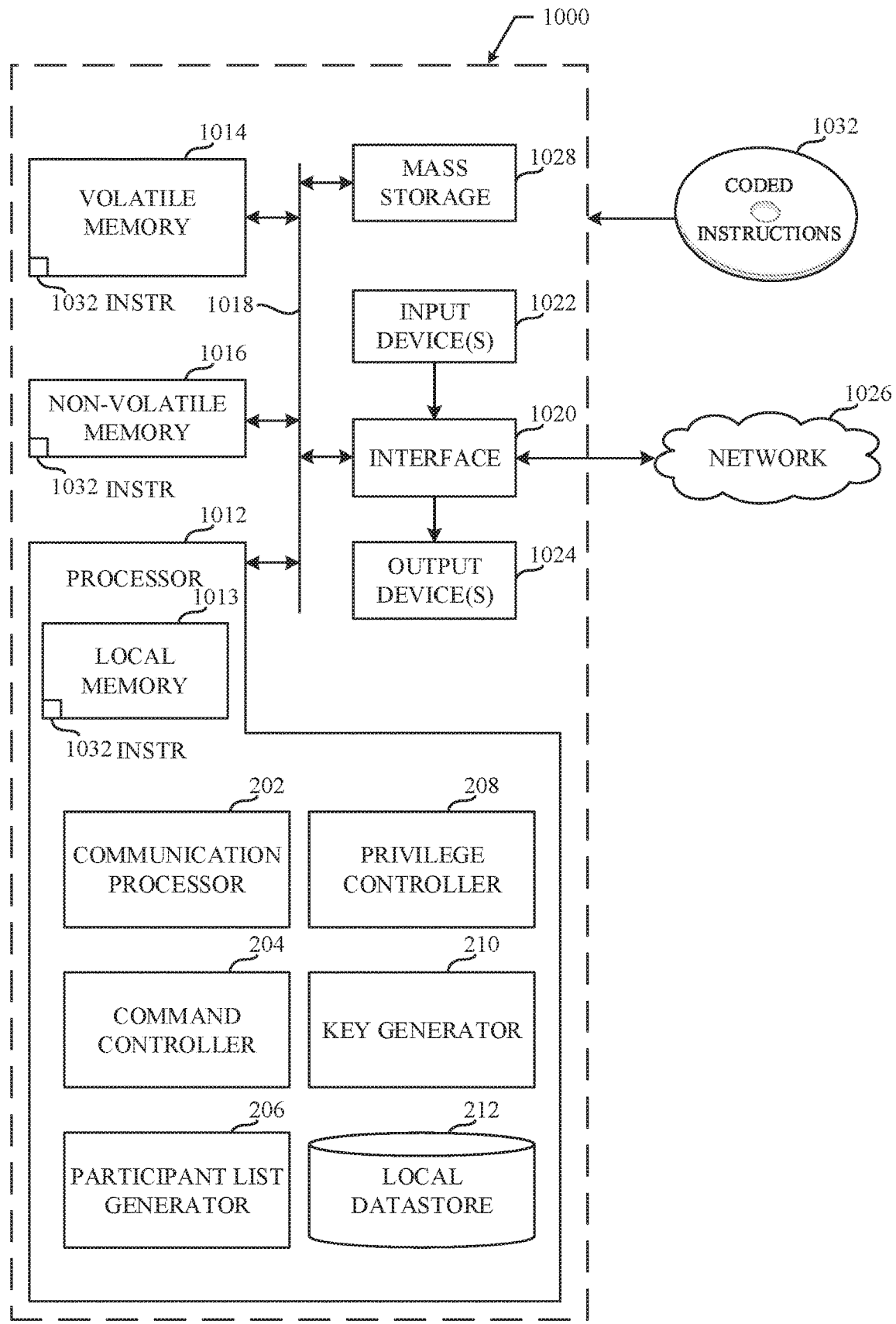
FIG. 10 is a block diagram of an example processing platform structured to execute the instructions of FIG. 7 to implement the ePolicy Orchestrator of FIGS. 1 and 2.

FIG. 10 is a block diagram of an example processing platform structured to execute the instructions of FIG. 7 to implement the ePolicy orchestrator (ePO) 102 of FIGS. 1 and 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor 1012 may be a semiconductor based (e.g., silicon based) device. In this example, the processor 1012 implements the example communication processor 202, the example command controller 204, the example participant list generator 206, the example privilege controller 208, the example key generator 210, the example local datastore 212, and/or, more generally, the example ePO 102.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random-Access Memory (SDRAM), Dynamic Random-Access Memory (DRAM), RAMBUS® Dynamic Random-Access Memory (RDRAM®) and/or any other type of random-access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface.

In the illustrated example, one or more input devices 1022 are connected to the interface circuit 1020. The input device(s) 1022 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip, and/or a graphics driver processor.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communications can be via, for example, an Ethernet connection, a digital subscriber line (DSL) connection, a telephone line connection, a coaxial cable system, a satellite system, a line-of-site wireless system, a cellular telephone system, etc.

The processor platform 1000 of the illustrated example also includes one or more mass storage devices 1028 for storing software and/or data. Examples of such mass storage devices 1028 include floppy disk drives, hard disk drives, compact disk drives, Blu-ray disk drives, redundant array of independent disks (RAID) systems, and digital versatile disk (DVD) drives.

Machine executable instructions 1032 of FIG. 10 may implement the example machine-readable instructions 700 of FIG. 7 and may be stored in the mass storage device 1028, in the volatile memory 1014, in the non-volatile memory 1016, and/or on a removable non-transitory computer readable storage medium such as a CD or DVD.

Figure 11:
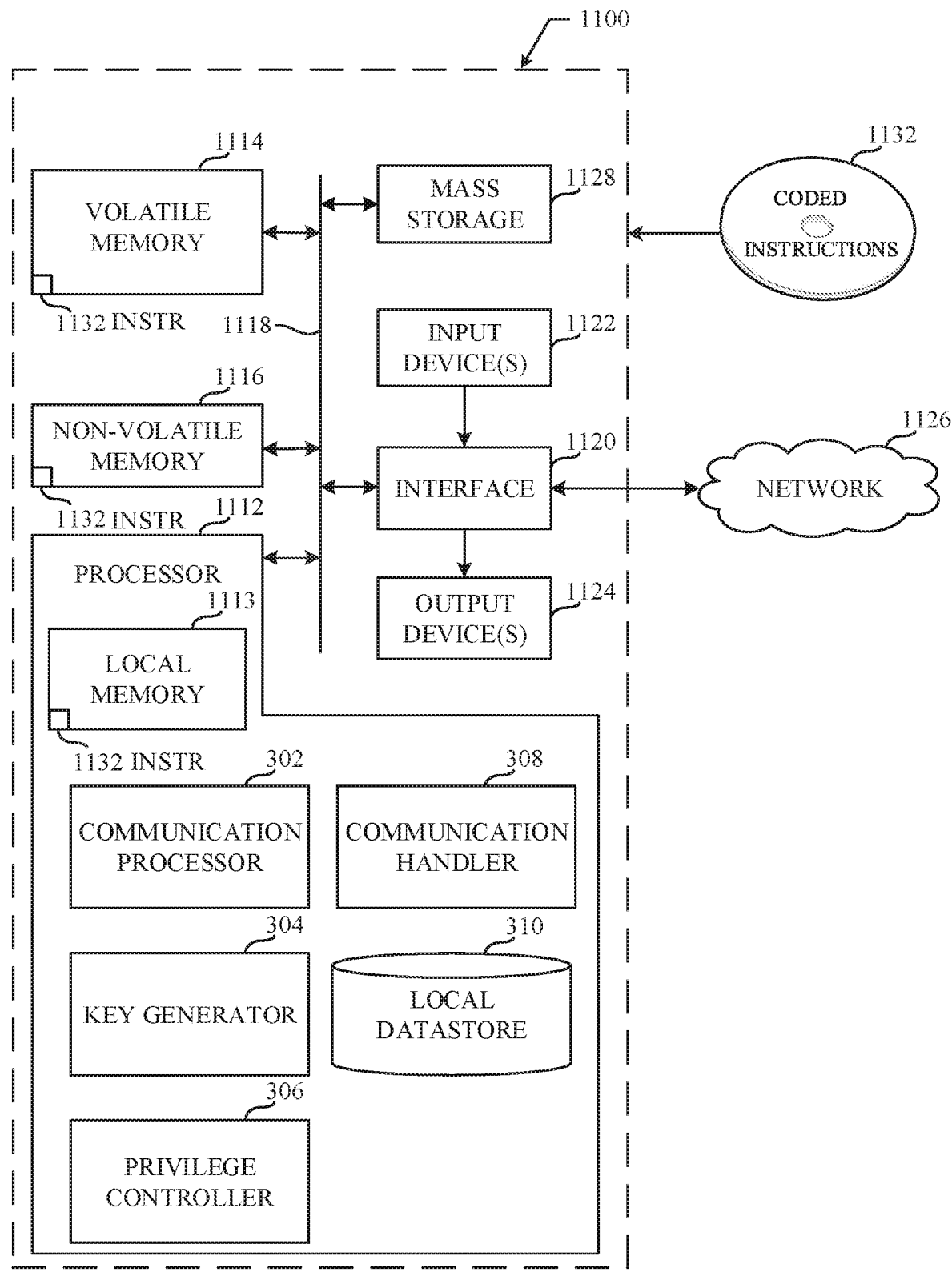
FIG. 11 is a block diagram of an example processing platform structured to execute the instructions of FIGS. 8 and 9 to implement the first endpoint device of FIGS. 1 and 3.

FIG. 11 is a block diagram of an example processing platform structured to execute the instructions of FIGS. 8 and 9 to implement the first endpoint device 106 of FIGS. 1 and 3. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor 1112 may be a semiconductor based (e.g., silicon based) device. In this example, the processor 1112 implements and/or the example communication processor 302, the example key generator 304, the example privilege controller 306, the example communication handler 308, the example local datastore 310, and/or, more generally, the example first endpoint device 106 (and/or the example second endpoint device 108, the example nth endpoint device 110, and/or the example SIEM 112).

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random-Access Memory (SDRAM), Dynamic Random-Access Memory (DRAM), RAMBUS® Dynamic Random-Access Memory (RDRAM®) and/or any other type of random-access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as an Ethernet interface, a universal serial bus (USB), a Bluetooth® interface, a near field communication (NFC) interface, and/or a PCI express interface.

In the illustrated example, one or more input devices 1122 are connected to the interface circuit 1120. The input device(s) 1122 permit(s) a user to enter data and/or commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip, and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communications can be via, for example, an Ethernet connection, a digital subscriber line (DSL) connection, a telephone line connection, a coaxial cable system, a satellite system, a line-of-site wireless system, a cellular telephone system, etc.

The processor platform 1100 of the illustrated example also includes one or more mass storage devices 1128 for storing software and/or data. Examples of such mass storage devices 1128 include floppy disk drives, hard disk drives, compact disk drives, Blu-ray disk drives, redundant array of independent disks (RAID) systems, and digital versatile disk (DVD) drives.

Machine executable instructions 1132 of FIG. 11 may implement the example machine-readable instructions 800 of FIG. 8 and/or the example machine-readable instructions 900 of FIG. 9 and may be stored in the mass storage device 1128, in the volatile memory 1114, in the non-volatile memory 1116, and/or on a removable non-transitory computer readable storage medium such as a CD or DVD.

Figure 12:
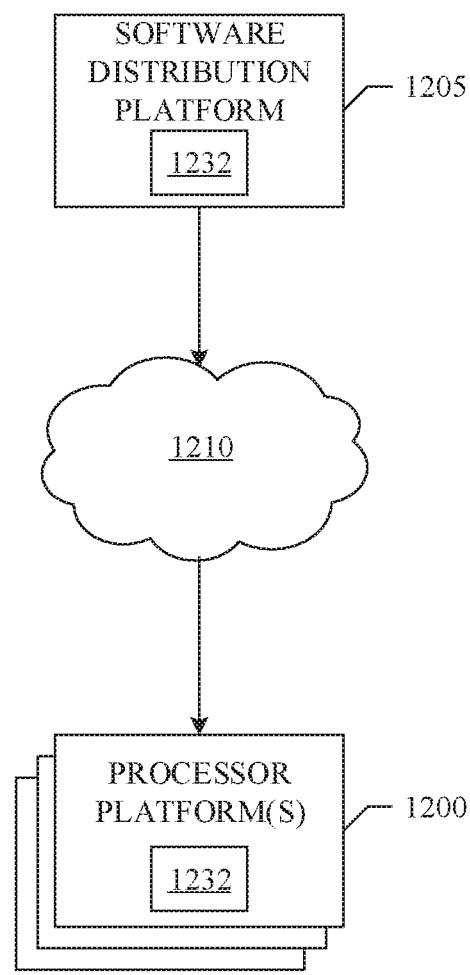
FIG. 12 is a block diagram of an example software distribution platform to distribute software to client devices such as consumers, retailers, and/or original equipment manufacturers (OEMs).

A block diagram illustrating an example software distribution platform 1205 to distribute software such as the example computer readable instructions 1232 of FIG. 12 to third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1232 of FIG. 12. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the computer readable instructions 1232, which may correspond to the example computer readable instructions the machine-readable instructions 700 of FIG. 7, the example machine-readable instructions 800 of FIG. 8, and/or the example machine-readable instructions 900 of FIG. 9, as described above. The one or more servers of the example software distribution platform 1205 are in communication with a network 1210, which may correspond to any one or more of the Internet and/or any of the example networks 104 described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 1232 from the software distribution platform 1205. For example, the software (e.g., the computer readable instructions 1232), which may correspond to the example machine-readable instructions 700 of FIG. 7, the example machine-readable instructions 800 of FIG. 8, and/or the example machine-readable instructions 900 of FIG. 9 may be downloaded to the example processor platform 1200, which is to execute the computer readable instructions 1232 to implement the example ePO 102 and/or the example first endpoint device 106 (and/or the example second endpoint device 108, the example nth endpoint device 110, and/or the example SIEM 112). In some example, one or more servers of the software distribution platform 1205 periodically offer, transmit, and/or force updates to the software (e.g., the example machine-readable instructions 700 of FIG. 7, the example machine-readable instructions 800 of FIG. 8, and/or the example machine-readable instructions 900 of FIG. 900) to ensure improvements, patches, updates, etc. are distributed and applied to the software at the end user devices.

From the foregoing, it will be appreciated that example methods, apparatus and articles of manufacture have been disclosed that securely audit communications. For example, the disclosed methods, apparatus, and articles of manufacture enable multiple parties to securely implement end-to-end encryption for security policy and event communication by leveraging rachet trees. Examples disclosed herein includes scalable generation of a shared communication key that allows for private, authenticated consumption (e.g., processing) of messages. Additionally, when the control plane server (e.g., the ePO 102) distributes shared system keys (e.g., that may be used to generate shared communication keys) via out of band trust, examples disclosed herein reduce the computational burden of securing networks (e.g., are more performant). Additionally, when the control plane server (e.g., the ePO 102) implements policies that control the capabilities of participant devices to read and/or write communications (e.g., to establish readers and/or writers), examples disclosed herein improve the security of networks. The disclosed methods, apparatus and articles of manufacture improve the efficiency of using a computing device by eliminating the computational burden associated with generating a shared communication key at endpoint devices and/or security appliances and improve security of networked devices. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   a participant list generator to, responsive to a command to add a security device to a secured group of devices in a network to prevent malicious activity, add the security device to a participant device list including one or more endpoint devices and a control plane server to generate an updated participant device list;
   a privilege controller to, based on a policy indicated in the command, set read and write privileges for the security device;
   a command controller to:
      based on the command, determine whether to generate a shared communication key using a shared system key; and
      at least one of:
         responsive to the command indicating to generate the shared communication key using the shared system key:
            transmit the shared system key and the read and write privileges for the security device to the one or more endpoints; and
            transmit the updated participant device list and the read and write privileges for the security device to the security device; or responsive to the command indicating not to generate the shared communication key using the shared system key, transmit the updated participant device list and the read and write privileges for the security device to the one or more endpoint devices and the security device;

a key generator to at least one of:
based on the command indicating not to generate the shared communication key using the shared system key, generate the shared communication key using a private key;
or
based on the command indicating to generate the shared communication key using the shared system key, generate the shared communication key using the shared system key; and a communication processor to encrypt communications with the one or more endpoint devices with the shared communication key.

2. The apparatus of claim 1, wherein the key generator is to generate the shared system key via an asynchronous ratchet tree group key calculation when the command indicates not to generate the shared communication key using the shared system key.

3. The apparatus of claim 1, wherein the command controller is configured to monitor an administrator for the command to add the security device to the secured group of devices in the network to prevent malicious activity.

4. The apparatus of claim 1, wherein the privilege controller is to, based on the policy, set the read and write privileges for the security device so that the security device can read communications from any of the one or more endpoint devices and the control plane server but cannot send communications to any of the one or more endpoint devices.

5. The apparatus of claim 1, wherein the security device includes a security information and event management server.

6. The apparatus of claim 1, wherein the command is to indicate to (a) generate the shared communication key using the shared system key when computational burden of the one or more endpoint devices is to be reduced, and (b) not to generate the shared communication key using the shared system key when security is to be optimized.

7. A non-transitory computer readable storage medium comprising instructions which, when executed, cause one or more processors to at least:
responsive to a command to add a security device to a secured group of devices in a network to prevent malicious activity, add the security device to a participant device list including one or more endpoint devices and a control plane server to generate an updated participant device list;
based on a policy indicated in the command, set read and write privileges for the security device;
based on the command, determine whether to generate a shared communication key using a shared system key;
at least one of:
responsive to the command indicating to generate the shared communication key using the shared system key:
transmit the shared system key and the read and write privileges for the security device to the one or more endpoints; and
transmit the updated participant device list and the read and write privileges for the security device to the security device; or responsive to the command indicating not to generate the shared communication key using the shared system key, transmit the updated participant device list and the read and write privileges for the security device to the one or more endpoint devices and the security device;
at least one of:
based on the command indicating not to generate the shared communication key using the shared system key, generate the shared communication key using a private key;
or
based on the command indicating to generate the shared communication key using the shared system key, generate the shared communication key using the shared system key; and
encrypt communications with the one or more endpoint devices with the shared communication key.

8. The computer readable storage medium of claim 7, wherein the instructions cause the one or more processors to at least generate the shared system key via an asynchronous ratchet tree group key calculation when the command indicates not to generate the shared communication key using the shared system key.

9. The computer readable storage medium of claim 7, wherein the instructions cause the one or more processors to at least monitor an administrator for the command to add the security device to the secured group of devices in the network to prevent malicious activity.

10. The computer readable storage medium of claim 7, wherein the instructions cause the one or more processors to at least, based on the policy, set the read and write privileges for the security device so that the security device can read communications from any of the one or more endpoint devices and the control plane server but cannot send communications to any of the one or more endpoint devices.

11. The computer readable storage medium of claim 7, wherein the security device includes a security information and event management server.

12. The computer readable storage medium of claim 7, wherein the instructions cause the one or more processors to at least indicate to (a) generate the shared communication key using the shared system key when computational burden of the one or more endpoint devices is to be reduced, and (b) not to generate the shared communication key using the shared system key when security is to be optimized.

13. A method comprising:
responsive to a command to add a security device to a secured group of devices in a network to prevent malicious activity, adding the security device to a participant device list including one or more endpoint devices and a control plane server to generate an updated participant device list;
based on a policy indicated in the command, setting read and write privileges for the security device;
based on the command, determining whether to generate a shared communication key using a shared system key;
at least one of:
responsive to the command indicating to generate the shared communication key using the shared system key:
transmitting the shared system key and the read and write privileges for the security device to the one or more endpoints; and transmitting the updated participant device list and the read and write privileges for the security device to the security device; or responsive to the command indicating not to generate the shared communication key using the shared system key, transmitting the updated participant device list and the read and write privileges for the security device to the one or more endpoint devices and the security device;

at least one of:
based on the command indicating not to generate the shared communication key using the shared system key, generating the shared communication key using a private key; or based on the command indicating to generate the shared communication key using the shared system key, generating the shared communication key using the shared system key; and encrypting communications with the one or more endpoint devices with the shared communication key.

14. The method of claim 13, wherein the generating of the shared system key includes generating the shared system key via an asynchronous ratchet tree group key calculation when the command indicates not to generate the shared communication key using the shared system key.

15. The method of claim 13, further including monitoring an administrator for the command to add the security device to the secured group of devices in the network to prevent malicious activity.

16. The method of claim 13, further including, based on the policy, setting the read and write privileges for the security device so that the security device can read communications from any of the one or more endpoint devices and the control plane server but cannot send communications to any of the one or more endpoint devices.

17. The method of claim 13, wherein the security device includes a security information and event management server.

* * * * *